United States Patent
Malladi et al.

(10) Patent No.: US 9,480,006 B2
(45) Date of Patent: Oct. 25, 2016

(54) FAST CELL SEARCH

(71) Applicant: QUALCOMM Incorporated, San Diego, CA (US)

(72) Inventors: Durga Prasad Malladi, San Diego, CA (US); Byoung-Hoon Kim, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/159,390

(22) Filed: Jan. 20, 2014

(65) Prior Publication Data

US 2014/0135001 A1   May 15, 2014

Related U.S. Application Data

(63) Continuation of application No. 11/972,523, filed on Jan. 10, 2008, now Pat. No. 8,634,403.

(60) Provisional application No. 60/884,402, filed on Jan. 10, 2007.

(51) Int. Cl.
*H04J 3/06* (2006.01)
*H04W 48/16* (2009.01)
*H04J 11/00* (2006.01)
*H04L 27/26* (2006.01)

(52) U.S. Cl.
CPC .......... *H04W 48/16* (2013.01); *H04J 11/0069* (2013.01); *H04L 27/2613* (2013.01); *H04L 27/2655* (2013.01); *H04L 27/2675* (2013.01)

(58) Field of Classification Search
None
See application file for complete search history.

(56) References Cited

U.S. PATENT DOCUMENTS

| | | |
|---|---|---|
| 6,487,252 B1 | 11/2002 | Kleider et al. |
| 6,590,881 B1 | 7/2003 | Wallace et al. |
| 6,744,747 B2 | 6/2004 | Shiu et al. |
| 7,013,135 B2 | 3/2006 | Hiramatsu |
| 7,292,548 B2 | 11/2007 | Lim et al. |

(Continued)

FOREIGN PATENT DOCUMENTS

| | | |
|---|---|---|
| CN | 1278375 A | 12/2000 |
| CN | 1344122 A | 4/2002 |

(Continued)

OTHER PUBLICATIONS

Co-pending U.S. Appl. No. 09/476,218, filed Dec. 30, 1999.

(Continued)

*Primary Examiner* — Kenny Lin
(74) *Attorney, Agent, or Firm* — Paul Kuo

(57) ABSTRACT

Systems and methodologies are described that facilitate searches for a cell in a wireless communication environment. A mobile device can employ a searcher that can detect timing information respectively associated with PSCs and cells to determine the cell with the highest correlation. The searcher can detect SSCs, which can include detecting associated phase information, to determine the SSC with the highest correlation, CP length, and/or other information to facilitate identifying a desired cell having the strongest signal to establish communication between the mobile device and the desired cell. PSCs respectively associated with cells can have different positions in the symbol sequences, and SSCs can respectively be phase shifted at different angles to facilitate detection and identification of a cell(s), where a PSC can be utilized as a phase reference by the associated SSC.

28 Claims, 29 Drawing Sheets

(56) References Cited

U.S. PATENT DOCUMENTS

| | | | |
|---|---|---|---|
| 7,532,590 | B2 | 5/2009 | Ok et al. |
| 7,567,781 | B2 | 7/2009 | Chen et al. |
| 7,633,976 | B2 | 12/2009 | Shieh et al. |
| 7,808,967 | B2 | 10/2010 | Han et al. |
| 7,920,598 | B2 | 4/2011 | Luo |
| 8,050,225 | B2 | 11/2011 | Luo |
| 8,634,403 | B2 | 1/2014 | Malladi et al. |
| 2002/0027898 | A1* | 3/2002 | Tanno et al. ............... 370/350 |
| 2003/0117980 | A1 | 6/2003 | Kim et al. |
| 2006/0050799 | A1 | 3/2006 | Hou et al. |
| 2007/0025428 | A1 | 2/2007 | Hahm et al. |
| 2007/0140106 | A1 | 6/2007 | Tsai et al. |
| 2007/0291770 | A1 | 12/2007 | Kitazoe |
| 2008/0019350 | A1* | 1/2008 | Onggosanusi et al. ....... 370/350 |
| 2008/0089282 | A1 | 4/2008 | Malladi et al. |
| 2008/0107086 | A1 | 5/2008 | Fukuta et al. |
| 2009/0122839 | A1 | 5/2009 | Luo et al. |
| 2009/0129298 | A1 | 5/2009 | Luo et al. |
| 2009/0181669 | A1 | 7/2009 | Naka et al. |
| 2009/0196279 | A1 | 8/2009 | Kim et al. |
| 2011/0002430 | A1* | 1/2011 | Kim et al. ............... 375/362 |
| 2012/0122446 | A1 | 5/2012 | Malladi et al. |

FOREIGN PATENT DOCUMENTS

| | | |
|---|---|---|
| CN | 1352834 A | 6/2002 |
| CN | 1473401 A | 2/2004 |
| EP | 1184995 A2 | 3/2002 |
| JP | 2001515294 A | 9/2001 |
| JP | 2003501872 A | 1/2003 |
| JP | 2003060553 A | 2/2003 |
| RU | 2233033 C2 | 7/2004 |
| RU | 2285337 C2 | 10/2006 |
| WO | WO-9912273 A1 | 3/1999 |
| WO | WO-00035117 | 6/2000 |
| WO | WO-0074276 A1 | 12/2000 |
| WO | WO-0150795 A1 | 7/2001 |
| WO | WO-02047361 | 6/2002 |
| WO | WO-02087113 A1 | 10/2002 |
| WO | WO-03019808 | 3/2003 |
| WO | WO-2005041448 | 5/2005 |
| WO | WO-2006134829 A1 | 12/2006 |
| WO | WO-2008053889 A1 | 5/2008 |

OTHER PUBLICATIONS

Interdigital Communications Corporation: "A BPSK Modulated Secondary Synchronization Codes based Cell Search in UTRA TDD", 3GPP TSG-RAN WG#5, R1-99578, Jun. 1999.

International Search Report—PCT/US2008-050792, International Searching Authority—European Patent Office—Jun. 13, 2008.

Nokia, et al., "Outcome of cell search drafting session," TSG-RAN WG1 #46bis Seoul, Korea, Oct. 9-13, 2006, R1-062990.

NTT DoCoMo: "Multiplexing Method of SCH for E-UTRA Downlink", 3GPP TSG-RAN WG1#47, R1-063303, Institute for Infocomm Research, Nov. 6, 2006, p. 1-9.

QUALCOMM Europe, "Initial cell search: analysis and simulations," 3GPP TSG-RAN WG1 #47, Nov. 6-10, 2006, Riga, Latvia, R1-063431, pp. 1-11.

QUALCOMM Europe: "Link analysis of initial cell search" 3GPP TSGRAN WG1 #46BIS, [Online] vol. r1-062691, Oct. 19, 2006-Oct. 13, 2006 pp. 1-13, XP0024776876 Seoul, Korea Retrieved from the Internet: URL:http://www.3gpp.org/ftp/tsg_ran/WG1_RL1/TSGR1_46bis/Oocs/R1-062691.zip [retrieved on Apr. 16, 2008].

Sharp: "Sector allocated SCH Structure in E-UTRA synchronized networks", 3GPP TSG-RAN WG1#46, R1-062254, Aug. 28, 2006.

Written Opinion—PCT/US2008/050792, International Search Authority, European Patent Office, Jun. 13, 2008.

ETRI, Cell Search Approach 1: Further Considerations[online], 3GPP TSG-RAN WG1#47 3GPP TSG-RAN WG1#47 R1-063520, <URL:http://www.3gpp.org/ftp/tsg_ran/WG1_RL1/TSGR1_47/Docs/R1-063520.zip>,Nov. 6, 2006, pp. 1-6.

LG Electronics, S-SCH Sequence Design for E-UTRA[online], 3GPP TSG-RAN WG1#47 3GPP TSG-RAN WG1#47 R1-063165,<URL:http://www.3gpp.org/ftp/tsg_ran/WG1_RL1/TSGR1_47/Docs/R1-063165.zip>, Nov. 6, 2006, pp. 1-10.

European Telecommunications Standard Institute (ETSI): "Universal Mobile Telecommunications System (UMTS); UMTS Terrestrial Radio Access (UTRA); Concept evaluation (UMTS 30.06 version 3.0.0)", XP002131074.

* cited by examiner

FAST CELL SEARCH

CROSS-REFERENCE TO RELATED APPLICATIONS

This application is a continuation of and claims the benefit of priority from U.S. patent application Ser. No. 11/972,523 filed Jan. 10, 2008, granted as U.S. Pat. No. 8,634,403 issued on Jan. 21, 2014 and entitled "FAST CELL SEARCH", which claims the priority to U.S. Provisional Patent application Ser. No. 60/884,402 entitled "A METHOD AND APPARATUS FOR FAST CELL SEARCH" filed on Jan. 10, 2007. The entirety of the aforementioned applications (including any appendices) is herein incorporated by reference.

BACKGROUND

I. Field

The following description relates generally to wireless communications, and more particularly to searching for cells in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), 3GPP LTE systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

A base station can also be referred to as a cell. When searching for a cell among a plurality of cells in a communication system (e.g., OFDM system), a mobile device can desire to detect information, such as Primary Synchronization Channels (PSCs) and Secondary Synchronization Channels (SSCs), generated by respective cells to facilitate locating and synchronizing with a cell to facilitate communication between the cell and the mobile device. It is desirable to be able to quickly search and locate a desired cell within a communication system.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating searching for a cell (e.g., base station) in a communication system. More particularly, exemplary systems and methodologies are described that facilitate searches for a cell in a wireless communication environment. For example, a mobile device can employ a searcher that can detect timing information respectively associated with PSCs and cells to determine the cell with the highest correlation. The searcher can detect SSCs, which can include detecting associated phase information, to determine the SSC with the highest correlation, CP length, and/or other information to facilitate identifying a desired cell having the strongest signal to establish communication between the mobile device and the desired cell. PSCs respectively associated with cells can have different positions in the symbol sequences, and SSCs can respectively be phase shifted at different angles to facilitate detection and identification of a cell(s), where a PSC can be utilized as a phase reference by the associated SSC.

According to an aspect, a method that facilitates a multi-stage cell search, comprises: detecting timing information related to primary synchronization channels (PSCs); and identifying a cell based in part on phase information associated with a SSC.

Another aspect provides for a computer readable medium having stored thereon computer executable instructions for carrying out the following acts: detecting timing information related to primary synchronization channels (PSCs); and identifying a cell based in part on phase information associated with a SSC.

Yet still another aspect provides for an apparatus operable in wireless communication system, the apparatus comprising: means for detecting timing information related to primary synchronization channels (PSCs); and means for identifying a cell based in part on phase information associated with a SSC.

Still yet another aspect provides for an apparatus operable in a wireless communication system that comprises a processor, configured to: detect timing information related to primary synchronization channels (PSCs); and identify a cell based in part on phase information associated with a SSC; and a memory coupled to the processor for storing data.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
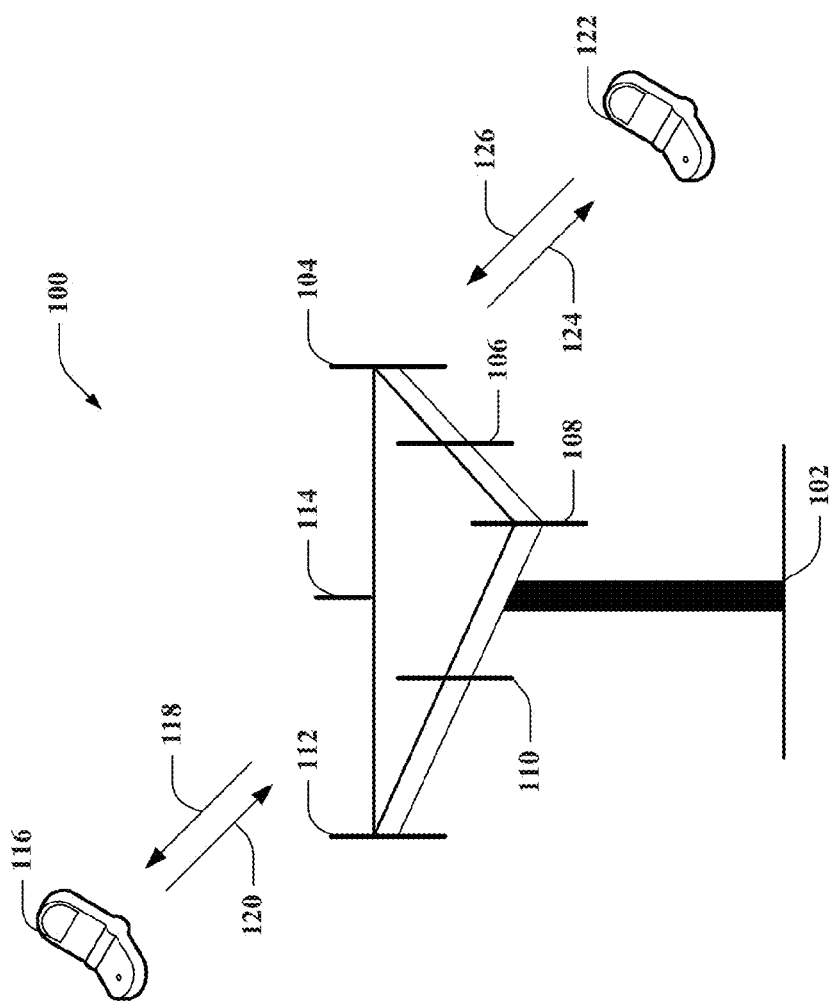
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a plurality of base stations 102 (only one base station 102 is depicted in FIG. 1 for clarity and brevity) that can each include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Each base station 102 can communicate with one or more mobile devices such as mobile device 116 and mobile device 122; however, it is to be appreciated that a base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In accordance with an aspect, a mobile device 116 can search for a desired base station 102 in the wireless communication environment (e.g., employing Orthogonal Frequency Division Multiplexing (OFDM) to facilitate system access), in order to locate, identify, and/or establish communications with the desired base station 102, so that the mobile device 116 can communicate (e.g., transmit data, receive data) in the wireless communication environment. For instance, a desired base station 102 can be a base station that provides the best (e.g., strongest) signal for communication. In order to communicate with a base station 102, the mobile device 116 synchronizes itself with the base station 102. To facilitate searching for and synchronizing to a desired base station 102, the mobile device 116 can receive and/or detect respective Primary Synchronization Channels (PSCs) and respective Secondary Synchronization Channels (SSCs) from respective base stations 102. The mobile device 116 can detect, analyze, and/or evaluate the received PSCs and SSCs to facilitate identifying and/or selecting a desired base station 102 in order to establish communications with such base station 102. The PSC from base stations can be a known signal with respect to the mobile device 116, and there can be a common PSC, or a relatively small number of PSCs, as to the base stations 102 in a network. The PSC can also provide the mobile device 116 with timing information that can be utilized to facilitate synchronization of the mobile device 116 with a base station 102. SSCs can be unique to respective base stations 102, and can facilitate identifying a particular base station 102 (e.g., the SSCs can include base station identification information, antenna information associated with a base station, etc.), where there can be a plurality of different SSCs. For instance, a SSC can be associated with a respective hypotheses, where there can be a plurality of different hypotheses. The mobile device 116 can detect and identify which SSC sequence has been transmitted from a particular cell (e.g., base station 102) and thereby the hypotheses can be known for that cell, as well as the identification of the cell.

Conventionally, in certain communication systems, such as OFDM systems, if each base station are transmitting the same PSC signal, a mobile device may not be able to differentiate between base stations to determine how many base stations and/or which base stations are transmitting respective signals, and this can inhibit and/or prevent a mobile device from identifying a desired base station when attempting to search for and identify a base station in order to establish communication.

In accordance with various aspects and embodiments, the subject innovation can facilitate shifting the PSC location for different base stations 102 so that the PSC transmit timing can be different for different base stations 102. As a result, the mobile device 116 can differentiate between disparate base stations 102 in the network in order to quickly and efficiently search for and identify a desired base station 102 (e.g., base station with strongest signal).

In one aspect, the mobile device 116 can search for a base station 102 where the cyclic prefix (CP) can be detected blindly. In such instance, the distance (e.g., relative timing distance) between two consecutive PSCs can be the same for both a long CP and a short CP, and can be fixed. For example, the distance D1 can be 5 ms. In accordance with an aspect, the SSCs respectively generated by base stations 102 can utilize Chu sequences with different bases or different cyclic shifts (e.g., different sequences). To facilitate searches, an additional phase shift of $e^{jk\theta}$ can be applied to the SSCs, where k=0, 1, 2, ..., M−1, and $\theta=2\pi/M$. M can relate to the number of different phases that can be employed, where, for example, a different phase shift can be applied to SSCs in each different base station 102 in the network. There is no phase applied to the PSC when the PSC is transmitted. When a SSC is transmitted, there is a phase shift (e.g., phase rotation) applied to the SSC, where the phase angle for the phase shift can be based in part on the PSC sequence.

The mobile device 116 can detect the respective phase shift of a SSC with respect to its associated PSC, and that phase shift can represent information that can be utilized by the mobile device 116 to facilitate identifying a particular base station 102.

In accordance with another aspect, SSC1 and SSC2 can have different combinations of phase shift, such as $e^{jk\theta}$ and $e^{jm\theta}$, for example, where k=0, 1, 2, ..., M−1, and m=0, 1, 2, ..., M−1, which can result in M*M potential combinations. In accordance with still another aspect, SSC1 and SSC2 can have the same phase shift $e^{jk\theta}$. In such instance, there can be improved phase detection probability. Also, there can be at least three potential combinations, for instance, that can represent antenna information (e.g., 1, 2, or 4 antennas) associated with a base station 102, and the phase information detected by the mobile device 116 can facilitate determining the number of antennas associated with such base station 102, as there can be a unique mapping between the number of phases (e.g., phase shift key (PSK)) and the number of antennas used by the base station 102. Accordingly, at least three groups (e.g., α, β, γ) can be represented by using a combination of SSC order in a radio frame and the phase modulation on top of SSCs.

The phase shift information associated with a SSC also can be utilized by a mobile device 116 to facilitate determining the location (e.g., position) of the associated PSC in the symbol sequence. For instance, the mobile device 116 can perform timing detection based in part on the detected PSC, which can be a correlation between the peak and the PSC sequence, and the mobile device 116 can utilize the phase information related to the SSC associated with the PSC to facilitate determining the base station 102 that transmitted such peak. By identifying the phase of the associated SSC, the mobile device 116 can determine which base station 102 is transmitting the PSC.

In one aspect, the CP length can be detected blindly after symbol timing detection.

In an aspect, the number of additional hypotheses carried by SSC and the reference signal can be flexible. For example, 64 hypotheses from two SSCs and 8 hypotheses from the reference signal can yield a total of 512 hypotheses. As another example, 512 hypotheses from the SSCs and the reference signal utilized for validation can result in a total of 512 hypotheses. It is to be understood and appreciated that the reference signal can be placed at the $0^{th}$ and $5^{th}$ symbols for both the long CP and short CP instances. It is also to be understood and appreciated that it is not necessary for the reference signal to be transmitted within the frequency band where PSC and SSC are transmitted, as the PSC and SSC can be utilized as a reference signal.

Turning briefly to FIGS. 2A-2F, illustrated is an example of radio frames 200, 202, 204, 206, 208, 210, respectively, that can be representative of radio frames respectively associated with different base stations 102 in a network. For instance, referring to radio frame 200, there can be a preamble (P) that can be a sub-frame of the radio frame. The PSCs and SSCs are typically only sent during the preamble (P) and the mid-amble (M). As depicted in radio frames 200, 202, and 204, the distance between PSCs can be fixed. For instance, the distance can be 5 ms. A SSC, such as SSC1 and SSC2, can be next to each PSC, respectively, in the sets of symbols. However, as depicted in radio frames, 200, 202, and 204, the position in the respective symbol sequences can be different, where, for instance, PSC can be in position 4 in the symbol sequence with respect to radio frame 200, PSC can be in position 3 with respect to radio frame 202, and PSC can be in position 2 of the symbol sequence with respect to radio frame 204.

A base station 102 can contain 3 sectors, for example, and each sector can utilize one of those radio frames 200, 202, 204 (e.g., can utilize the timing of the respective radio frames 200, 202, 204). For instance, a sector 0 can utilize radio frame 200, a sector 1 can utilize radio frame 202, and a sector 2 can utilize radio frame 204. Even though the sectors are part of the same base station 102, when the respective sectors transmit their PSCs, the respective PSCs are not overlapping, because each PSC can occupy a different position in terms of time. The mobile station 116 can detect each of the three different PSCs.

Conventionally, the PSCs would each occupy the same position in the sequence, and as a result, a mobile station effectively would only see one PSC, and could not differentiate between disparate PSCs, because all the PSCs would arrive to the mobile station at the same time.

With regard again to radio frames 200, 202, and 204, for each PSC there can be a SSC associated therewith. To facilitate detecting the phase reference of a SSC, the PSC can be utilized as a phase reference. Each SSC of the radio frames 200, 202, 204, can have a different phase reference because each PSC occupies different positions in the symbol sequence, so the channel between the base station 102 and the mobile device 116 for each PSC can be different. Once a respective channel is applied to a SSC, unique channel information can be observed.

Conventionally, where the PSCs occupy the same location in the symbol sequence, the channels can overlap and the unique channel information cannot be observed. As a result, identifying a desired base station can be inhibited and/or prevented.

Referring again to radio frames 200, 202, and 204, for example, different base stations 102 can be transmitting different PSC sequences with different phase shifts for respective SSCs respectively associated with the PSCs. The mobile device 116 can detect the PSC with the strongest correlation (e.g., highest peak, strongest signal). The mobile station 116 can detect information related to the SSCs, such as phase shift information, that are associated with the strongest signal to facilitate determining the base station 102 that transmitted the strongest signal. The mobile device 116 can evaluate the information associated with such SSCs to identify the base station 102 that transmitted the strongest signal, and can establish communications with that base station 102.

Figure 2A:
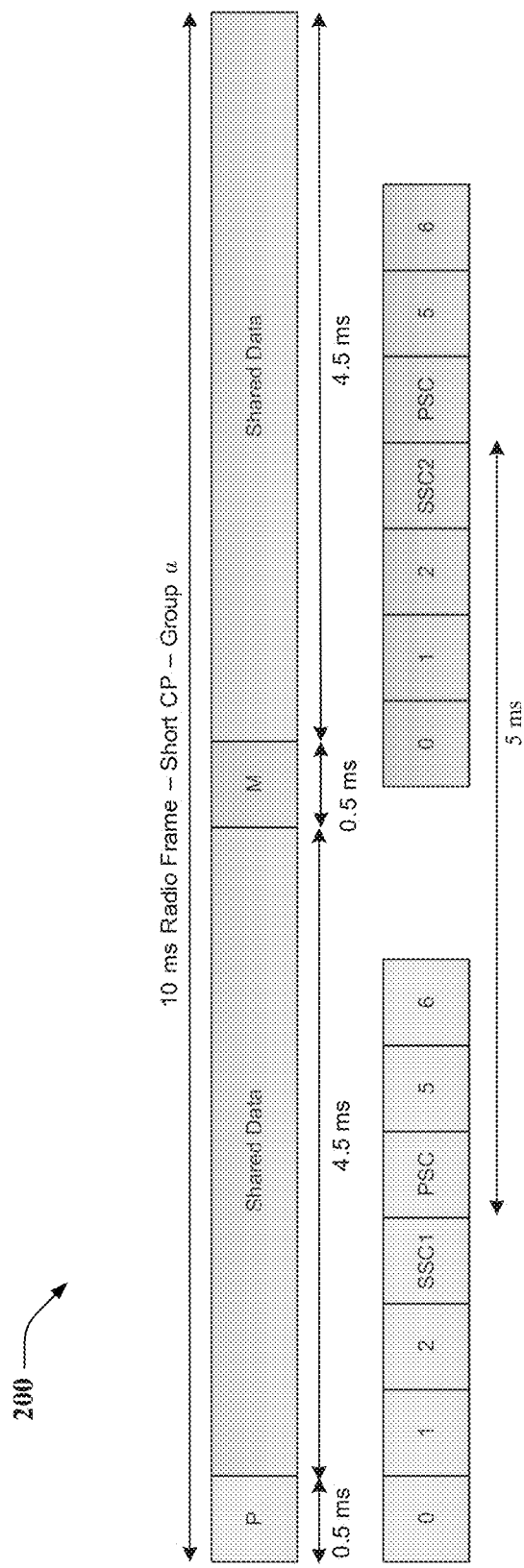
FIGS. 2A-2F are illustrations of example radio frames that can be associated with respective base stations within a wireless communication environment.
Figure 2B:
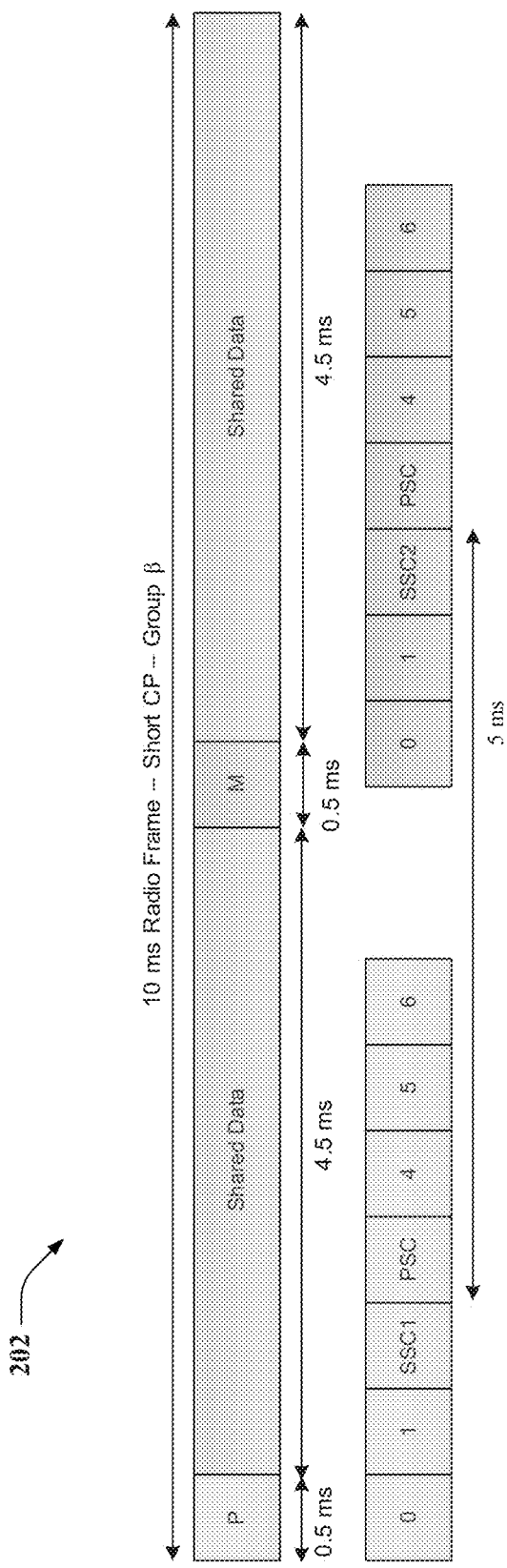
Figure 2C:
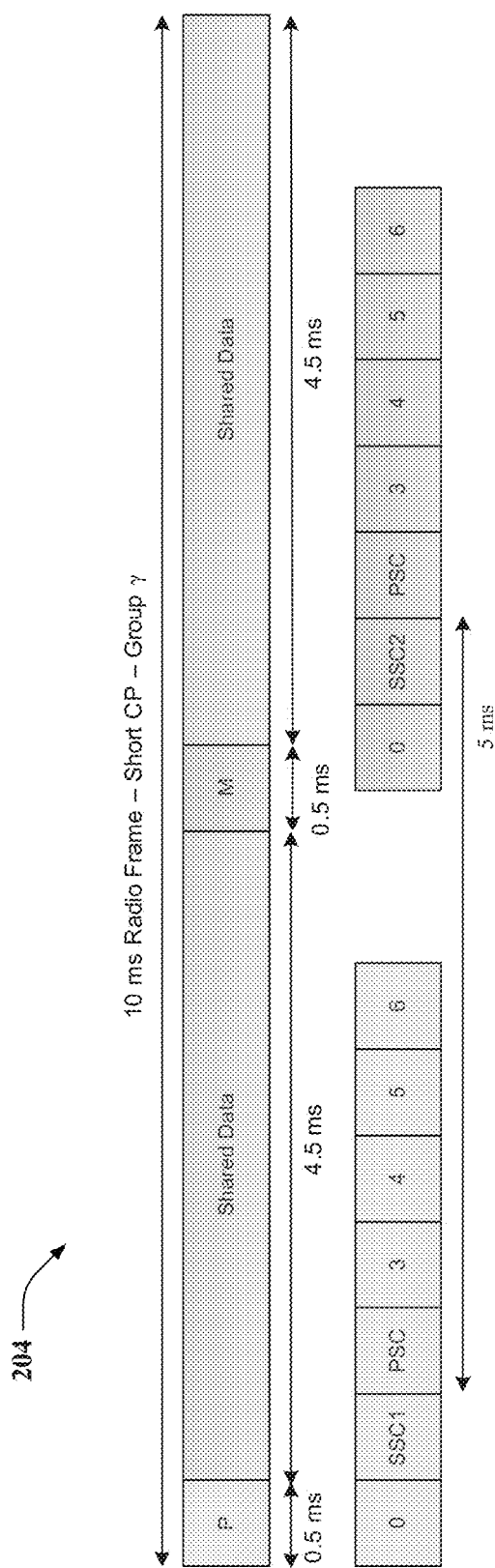
Figure 2D:
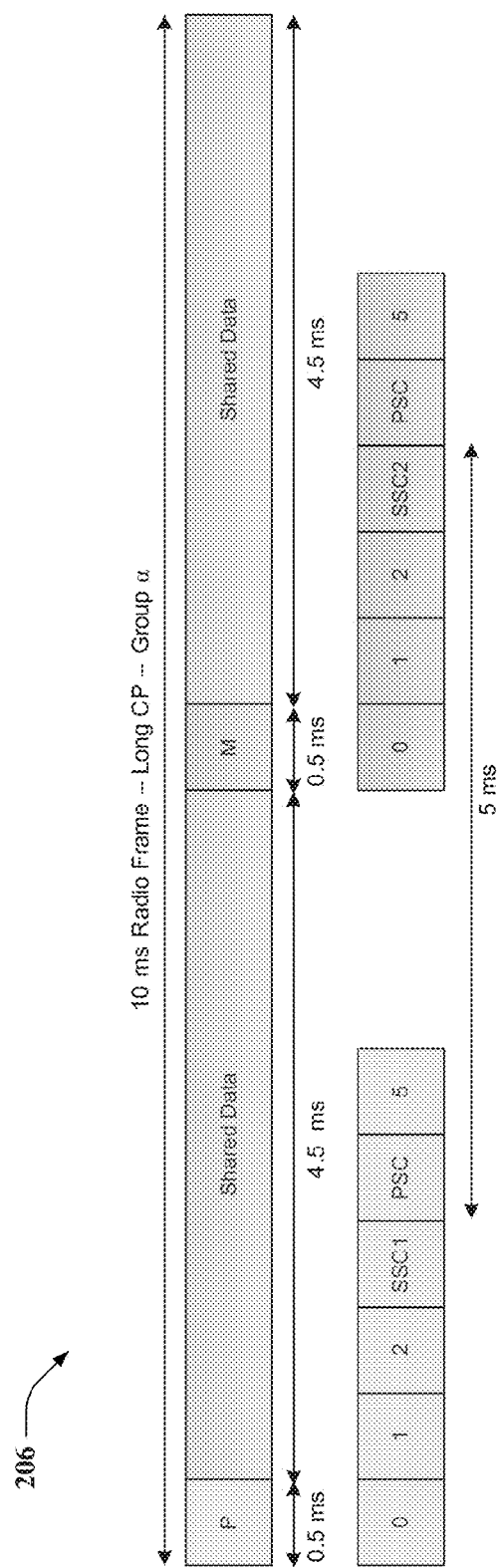
Figure 2E:
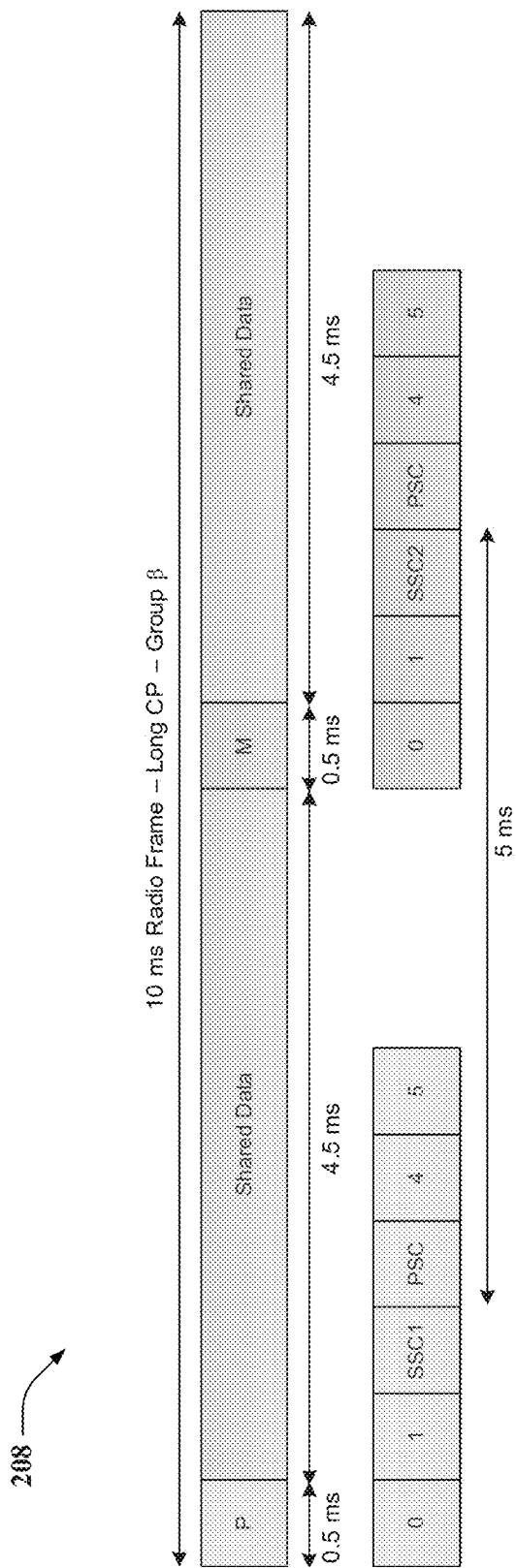
Figure 2F:
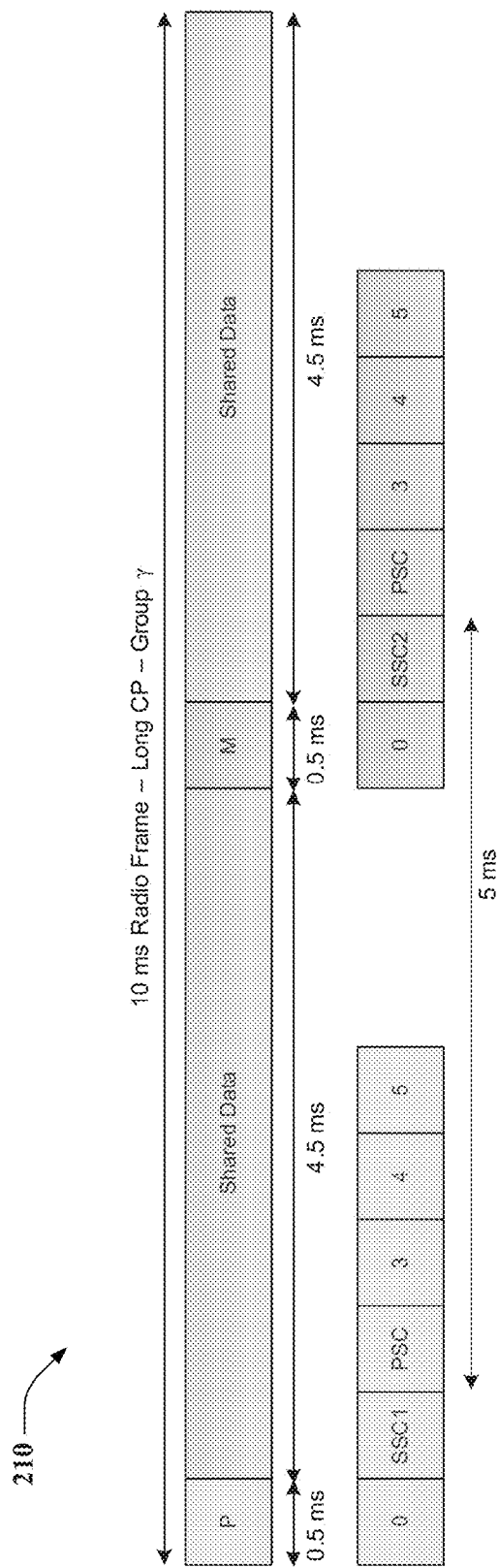

With regard to FIGS. 2D-2F and corresponding radio frames 206, 208, and 210, such radio frames depict a long CP. For each group α, β, γ, the respective PSCs can have a location in the symbol sequence that can be unique to the group in which a respective PSC belongs to facilitate differentiating between PSCs, similar to that of the radio frames 200, 202, 204 of the short CP. Also, unique phase shifting of the respective SSCs for each group α, β, γ can be employed to facilitate providing information regarding respectively associated PSCs to facilitate identifying a base station 102 that has the PSC with the strongest correlation.

As the CP can be unknown to the mobile device 116, during detection, the mobile device 116 also can perform blind CP detection to facilitate determining the CP. For instance, when the mobile device 116 has detected a desired signal from detecting the PSC, and has detected additional information, such as phase reference information related to SSCs, the mobile device 116 can detect (e.g., test the hypotheses) the signal strengths of SSCs respectively associated with a long CP and a short CP that can each have the same phase shift (e.g., group β with long CP, and group β with short CP), for instance. The mobile device 116 can compare the respective signal strengths (e.g., correlation values) of the respective SCCs to determine the particular group that has the highest correlation value, which can be the group (e.g., base station 102) having the strongest signal, and can be the desired base station 102, and the CP also can be determined as a result.

The respective relative timing and respective phase shifts for SSCs of the respective radio frames 200, 202, 204, 206, 208, 210 is provided in Table 1, where in Table 1, provided is an example where the same phase shift can be used for both SSCs, where M=3 (e.g., 3-Phase Shift Key (PSK)):

TABLE 1

| | Relative timing between 2 PSCs | Phase Shift for SSC1 | Phase Shift for SSC2 |
|---|---|---|---|
| Group α: short CP | D1 ms | $\theta = 0$ | $\theta = 0$ |
| Group β: short CP | D1 ms | $\theta = \frac{2\pi}{3}$ | $\theta = \frac{2\pi}{3}$ |
| Group γ: short CP | D1 ms | $\theta = \frac{4\pi}{3}$ | $\theta = \frac{4\pi}{3}$ |
| Group α: long CP | D1 ms | $\theta = 0$ | $\theta = 0$ |
| Group β: long CP | D1 ms | $\theta = \frac{2\pi}{3}$ | $\theta = \frac{2\pi}{3}$ |
| Group γ: long CP | D1 ms | $\theta = \frac{4\pi}{3}$ | $\theta = \frac{4\pi}{3}$ |

For instance, the mobile device 116 can determine that the group β with short CP has the strongest correlation based in part on the detection of the PSCs, and the location of the PSCs in the symbol sequences can facilitate providing a unique phase reference for a SSC with respect to an associated PSC when the mobile station 116 detects the SSCs associated with the PSCs. The mobile device 116 can detect the phase shift of the respective SSCs, SSC1 and SSC2, which, in this example, can each be $\theta=2\pi/3$, and, since the mobile device 116 does not yet know whether the strong signal (e.g., highest peak) is associated with a short CP or a long CP, the mobile device 116 can perform blind CP detection and can test the respective hypotheses of both the group β having short CP and group β having long CP, where the signal of the SSC for group β having short CP and the signal of the SSC for group β having long each can be detected and compared with each other to facilitate determining which of the respective SSCs has a stronger signal (e.g., higher correlation), as the signal of the SSC for the short CP can have a different value than the signal of the SSC for the long CP. As a result, the proper CP can be determined, which can facilitate identifying the desired base station 102 (e.g., the desired group in the example). Based in part on the detections and evaluations by the mobile device 116, the mobile device 116 can determine that the PSC with the strongest correlation is associated with group β with short CP. The mobile station 116 has thereby identified the desired base station 102 and can establish communications with that base station 102.

Referring again to FIG. 1, in yet another aspect, there can be an alternative hybrid approach to facilitate searching for a desired base station 102 in a wireless communication environment. The mobile device 116 can search for and identify a desired base station 102, where the distance (e.g., relative timing distances) between two consecutive PSCs associated with a short CP can be different from the distance between two consecutive PSCs associated with a long CP, although the CP length for each group (e.g., long CP group of α, β, γ, short CP of α, β, γ) can be the same distance (e.g., short CP group can have timing distance of D1, long CP group can have relative timing distance of D1+D2). CP length can be detected by testing the two different distances between two consecutive PSCs. This hybrid approach can be more efficient since the sum power of two time aligned PSC symbols despread by PSC sequence can be compared with the sum power of two random OFDM symbols despread by PSC sequence. The relative distance of any two consecutive PSCs can be fixed. For instance, D1 can be the relative distance of the short CP, and D2 can be the relative distance for the long CP, where, for example, D1 can be 5 ms and D2 can be 83 μs.

In accordance with an aspect, the SSCs respectively generated by base stations 102 can utilize Chu sequences with different bases or different cyclic shifts. To facilitate searches, an additional phase shift of $e^{jk\theta}$ can be applied to the SSC, where k=0, 1, 2, . . . , M−1 and $\theta=2\pi/M$.

In accordance with another aspect, SSC1 and SSC2 can have different combinations of phase shift, such as $e^{jk\theta}$ and $e^{jm\theta}$, for example, where k=0, 1, 2, . . . , M−1, and m=0, 1, 2, . . . , M−1, which can result in M*M potential combinations. In accordance with still another aspect, SSC1 and SSC2 can have the same phase shift $e^{jk\theta}$. In such instance, there can be improved phase detection probability. Also, there can be at least three potential combinations, for instance, that can represent antenna information (e.g., 1, 2, or 4 antennas) associated with a base station 102. Accordingly, at least three groups (e.g., α, β, γ) can be represented by using a combination of SSC order in a radio frame and the phase modulation on top of SSCs.

In an aspect, the number of additional hypotheses carried by SSC and the reference signal can be flexible. For example, 64 hypotheses from two SSCs and 8 hypotheses from the reference signal can yield a total of 512 hypotheses. As another example, 512 hypotheses from the SSCs and the reference signal utilized for validation can result in a total of 512 hypotheses. It is to be understood and appreciated that the reference signal can be placed at the $0^{th}$ and $5^{th}$ symbols for both the long CP and short CP instances.

Turning briefly to FIGS. 3A-3F, illustrated is an example of radio frames 300, 302, 304, 306, 308, 310, respectively, that can be representative of radio frames respectively associated with different base stations 102 in a network. The respective relative timing and respective phase shifts for SSCs of the respective radio frames 300, 302, 304, 306, 308, 310 is provided in Table 2, where in Table 2, provided is an example of using the same phase shift for both SSCs, where M=3 (e.g., 3-PSK) is used:

TABLE 2

| | Relative timing between 2 PSCs | Phase Shift for SSC1 | Phase Shift for SSC2 |
|---|---|---|---|
| Group α: short CP | D1 ms | $\theta = 0$ | $\theta = 0$ |
| Group β: short CP | D1 ms | $\theta = \frac{2\pi}{3}$ | $\theta = \frac{2\pi}{3}$ |
| Group γ: short CP | D1 ms | $\theta = \frac{4\pi}{3}$ | $\theta = \frac{4\pi}{3}$ |
| Group α: long CP | D1 ms + D2 μs | $\theta = 0$ | $\theta = 0$ |
| Group β: long CP | D1 ms + D2 μs | $\theta = \frac{2\pi}{3}$ | $\theta = \frac{2\pi}{3}$ |
| Group γ: long CP | D1 ms + D2 μs | $\theta = \frac{4\pi}{3}$ | $\theta = \frac{4\pi}{3}$ |

Figure 3A:
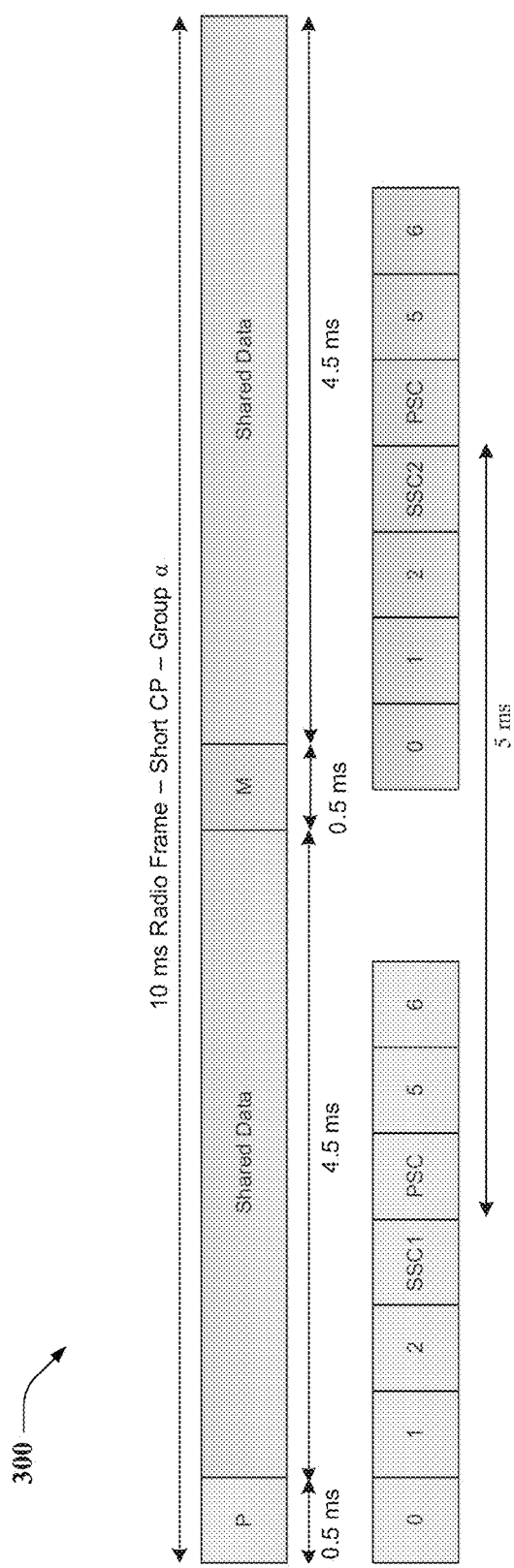
FIGS. 3A-3F are illustrations of other example radio frames that can be associated with respective base stations within a wireless communication environment.
Figure 3B:
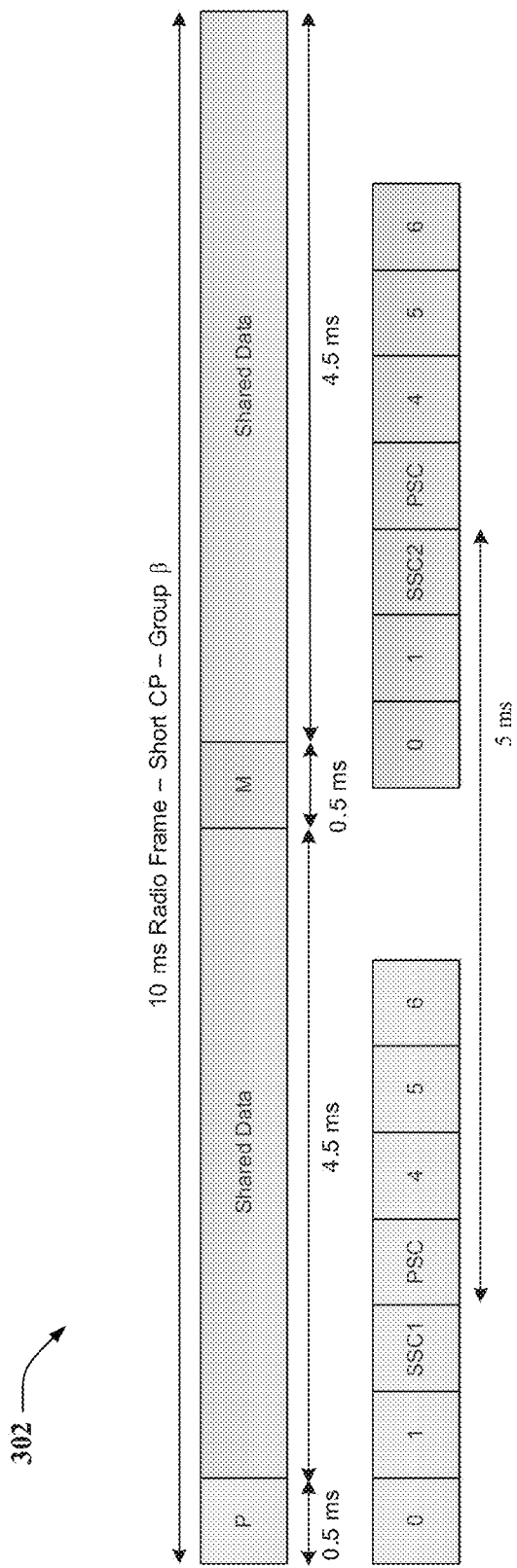
Figure 3C:
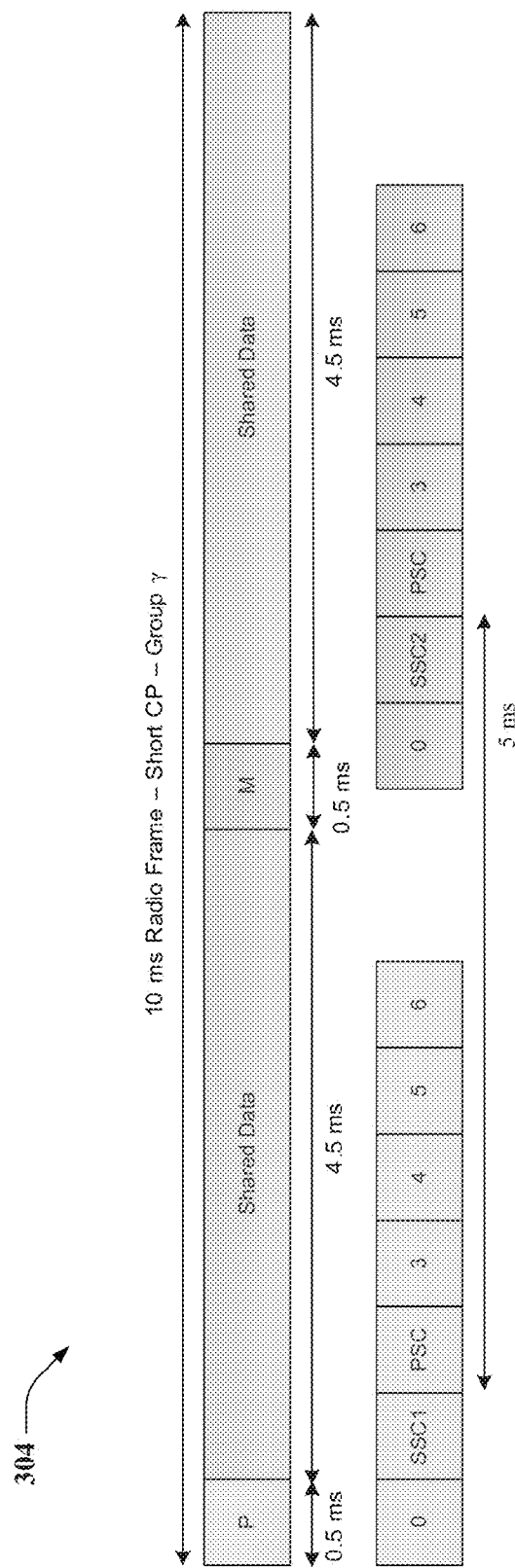
Figure 3D:
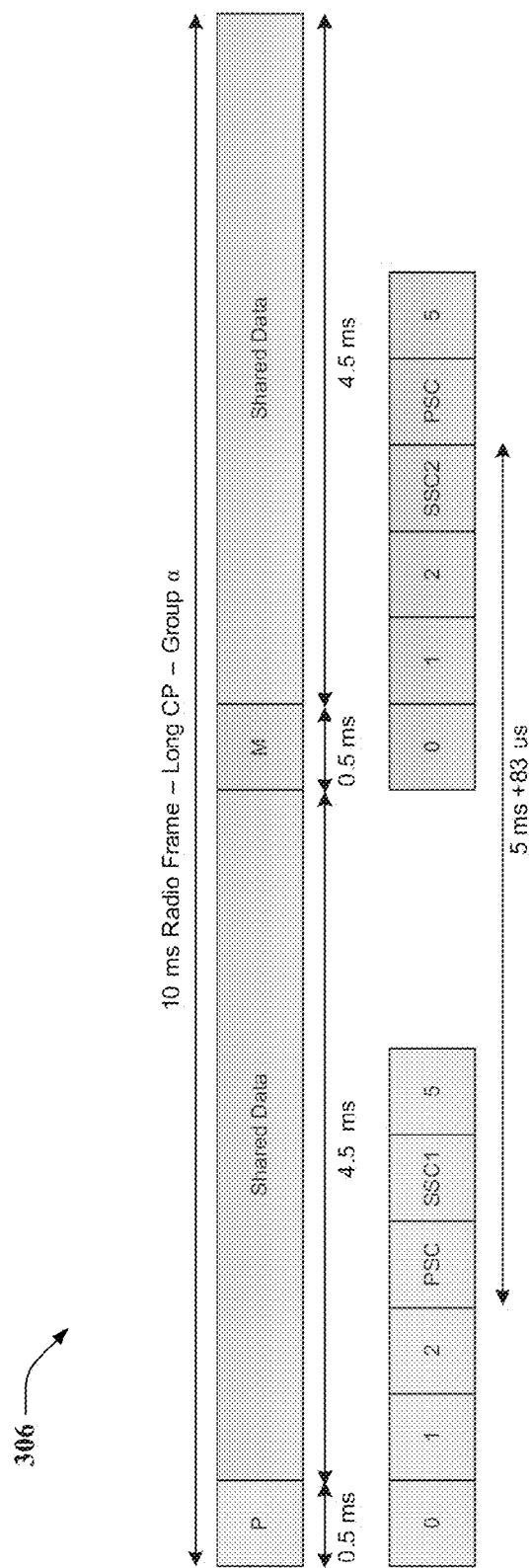
Figure 3E:
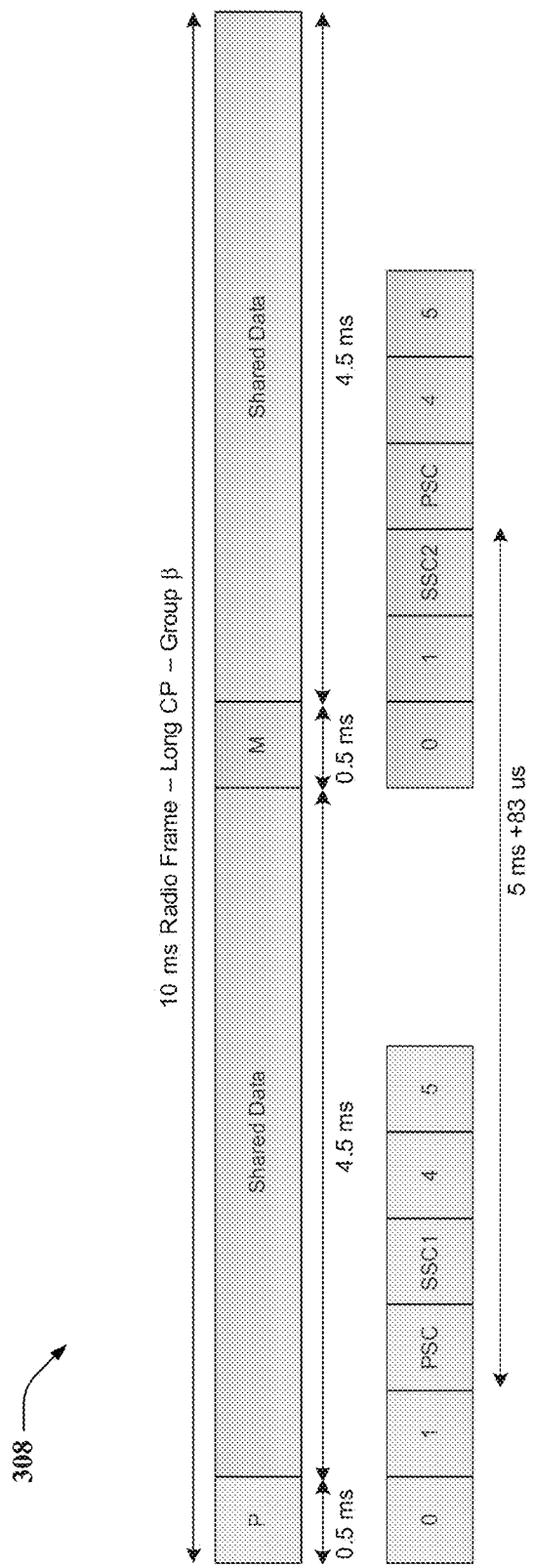
Figure 3F:
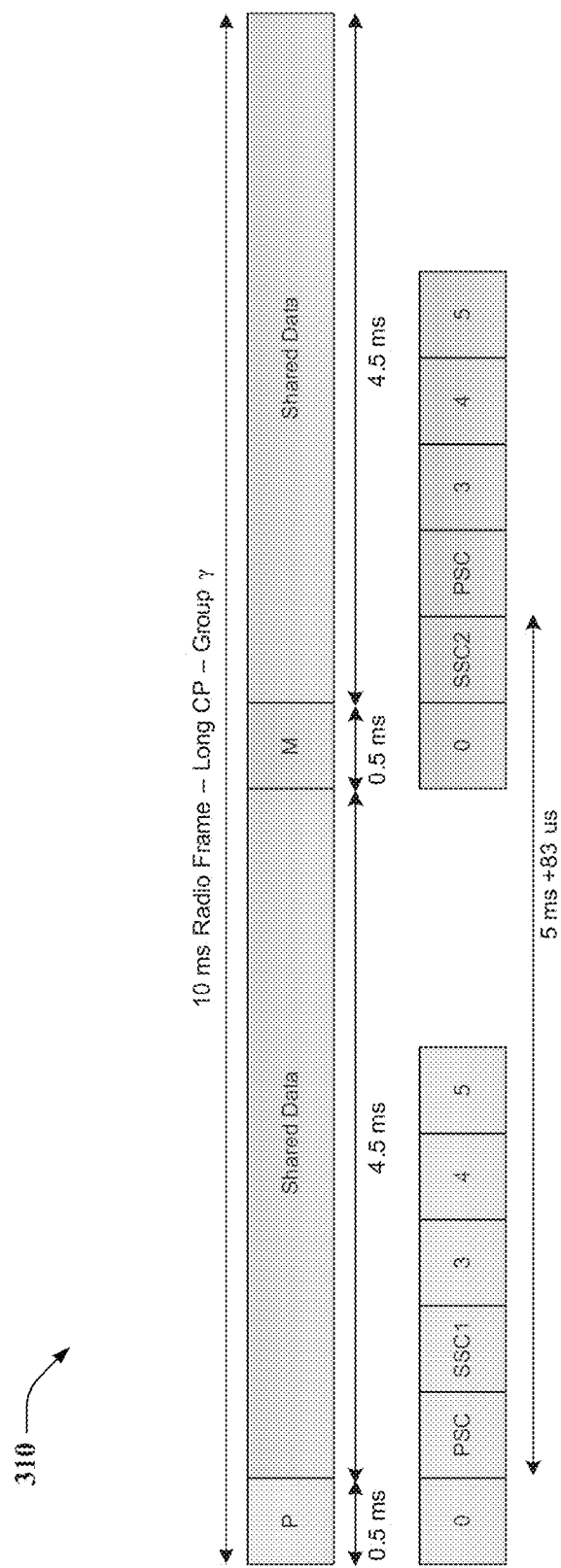
Figure 4A:
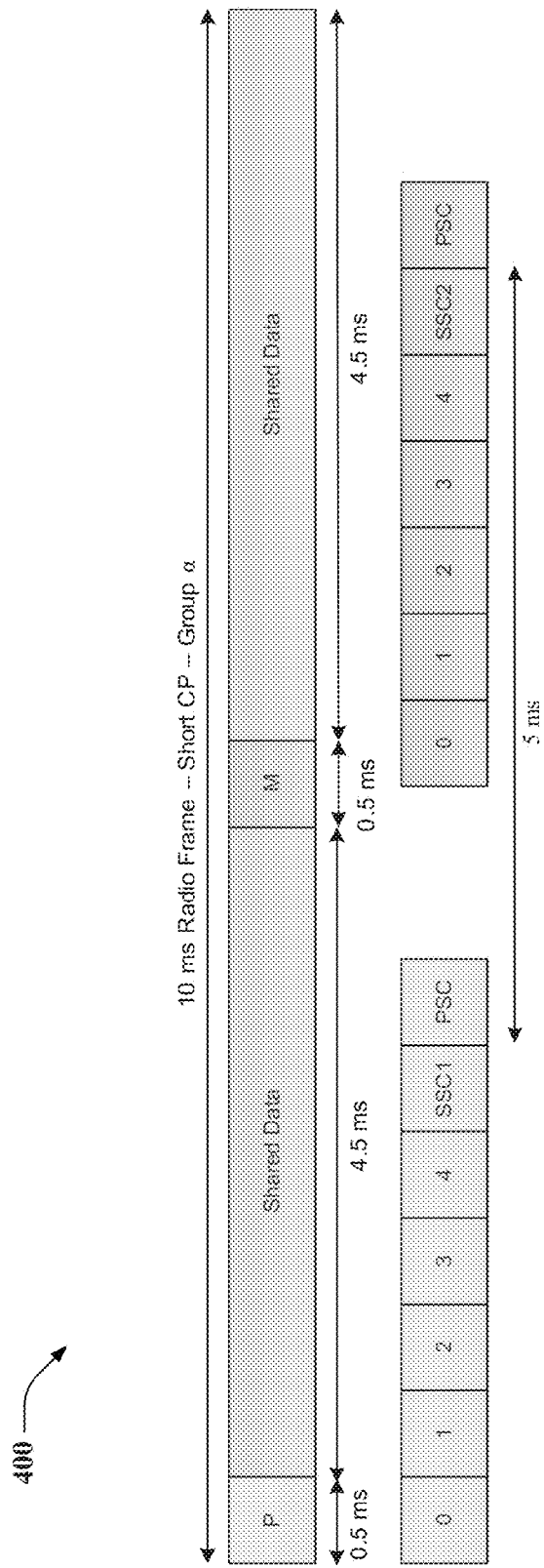
FIGS. 4A-4F are illustrations of still other example radio frames that can be associated with respective base stations within a wireless communication environment.
Figure 4B:
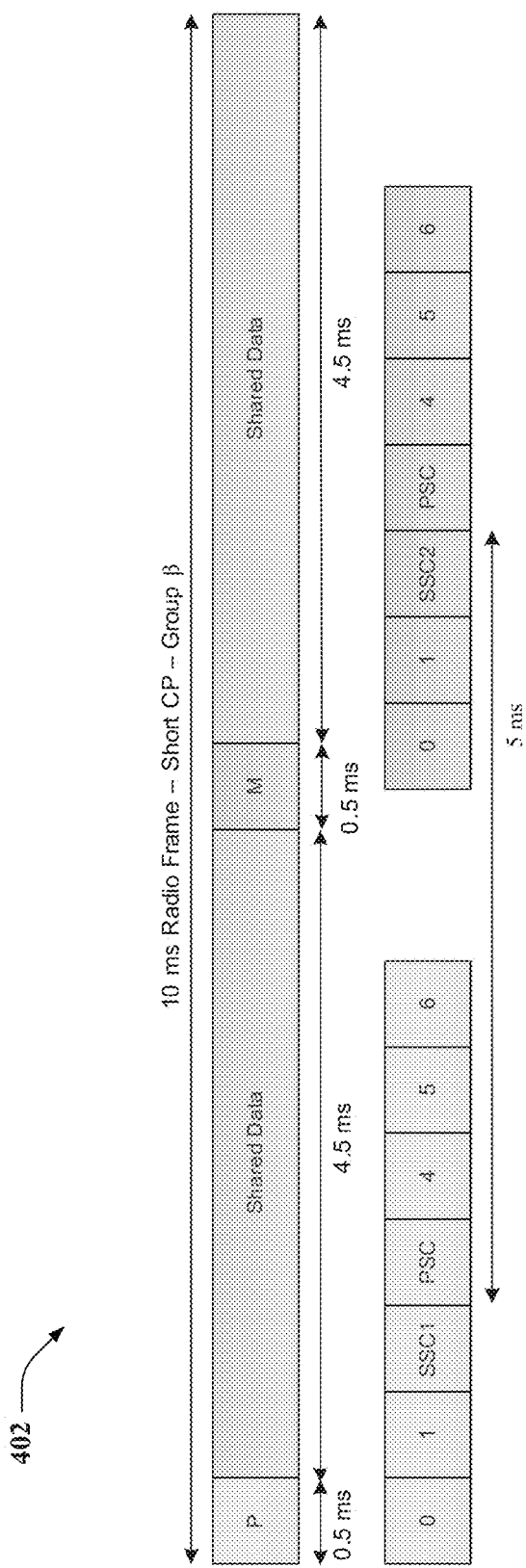
Figure 4C:
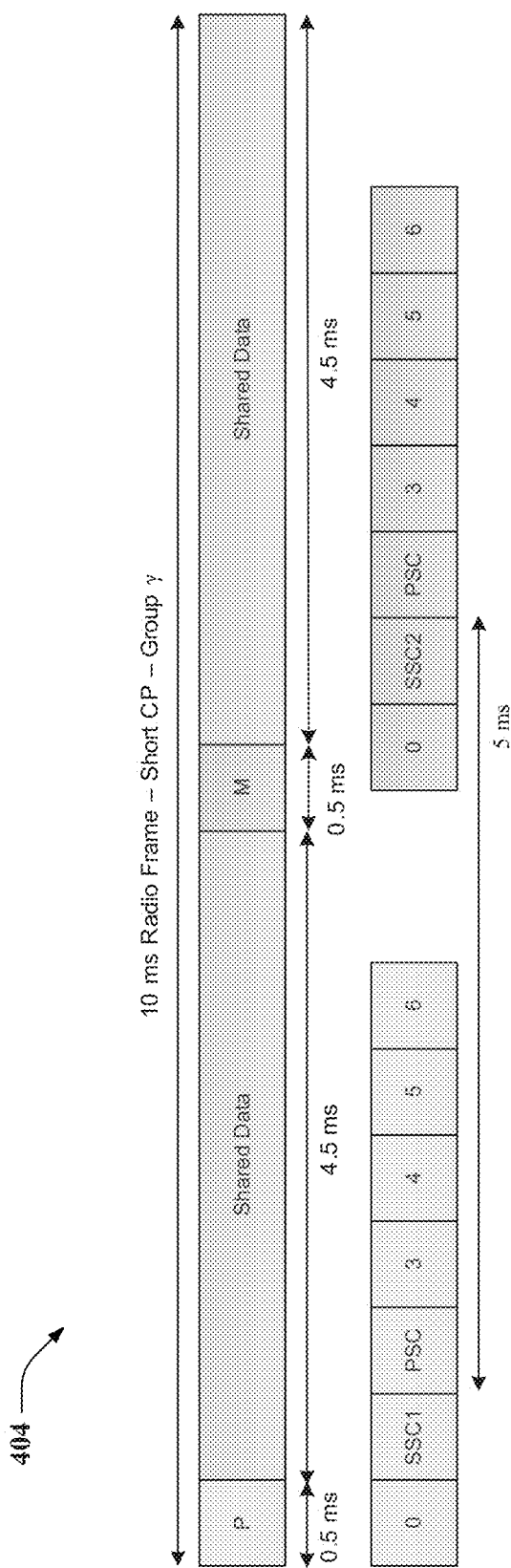
Figure 4D:
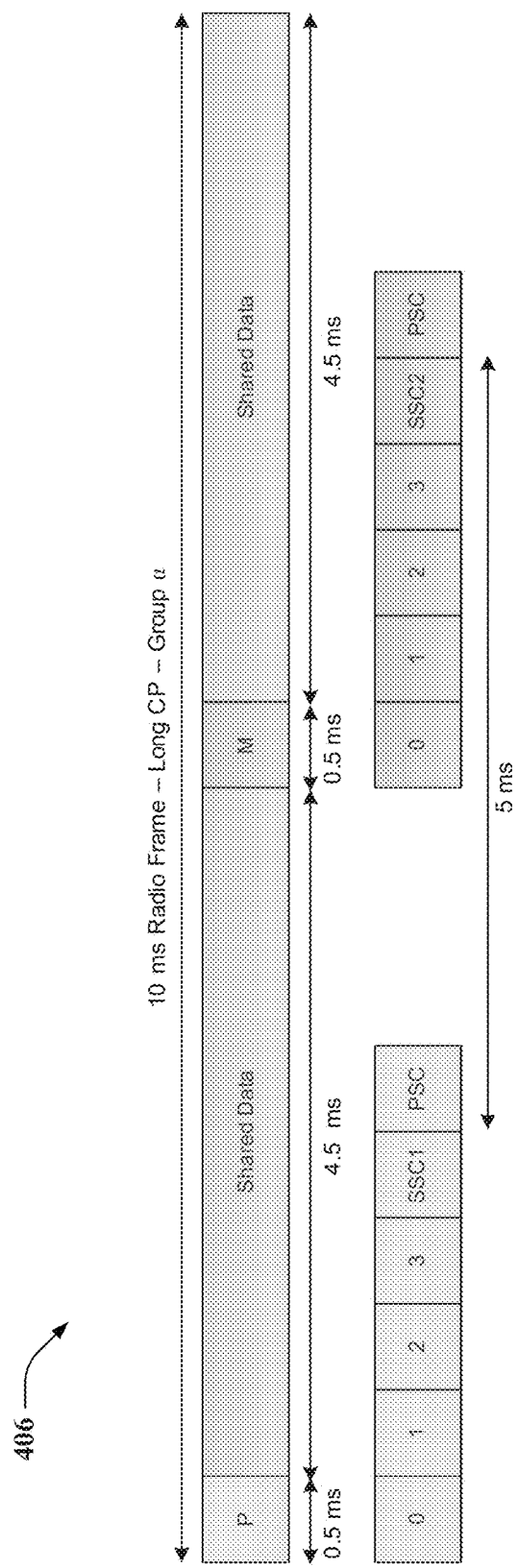
Figure 4E:
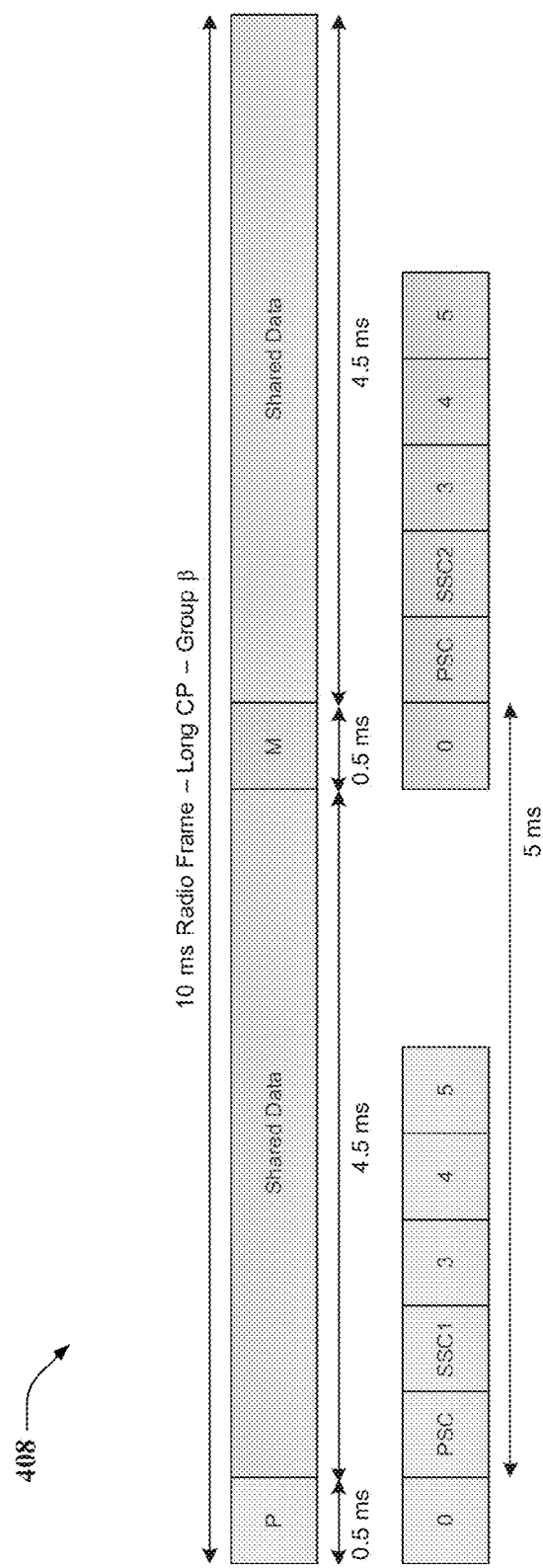
Figure 4F:
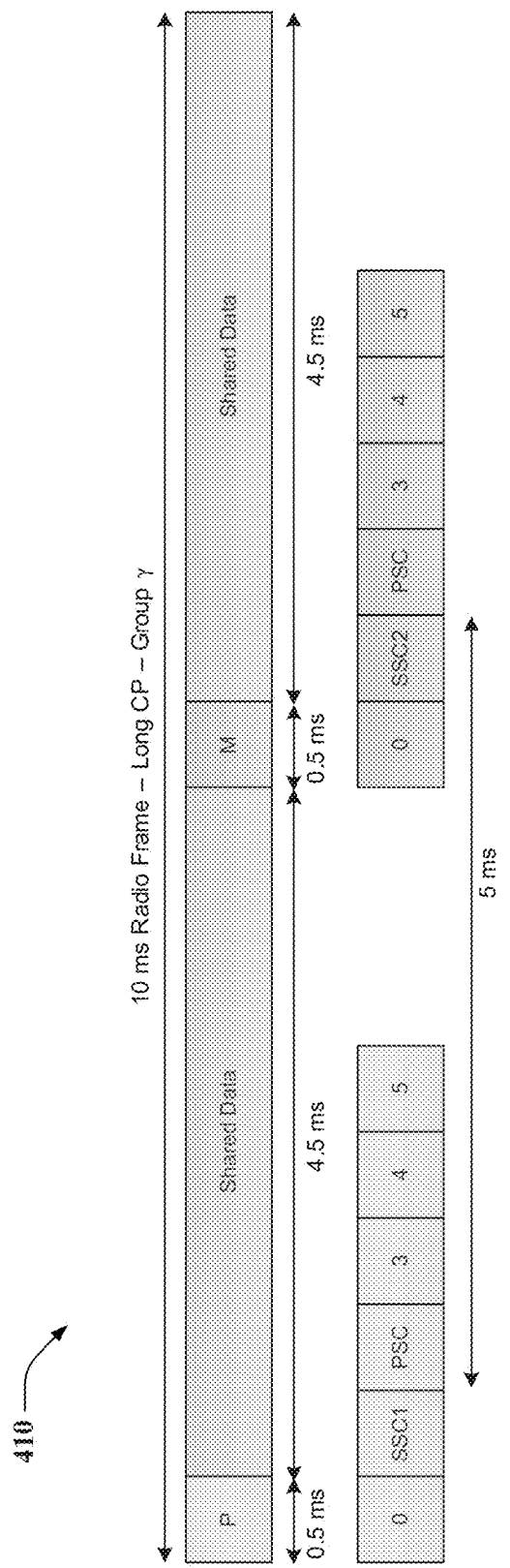

With regard to FIGS. 3A-3C and corresponding radio frames 300, 302, and 304, such radio frames have a short CP. With regard to FIGS. 3D-3F and corresponding radio frames, 306, 308, and 310, such radio frames have a long CP. As depicted in Table 2, the radio frames associated with the short CP can have the same relative distance with respect to each other, and the radio frames associated with the long CP can have the same relative distance with respect to each other, but such relative distance can be different (e.g., greater) than the relative distance of the radio frames having a short CP. The respective distance information of the short CP and long CP can be utilized to facilitate determining the CP during detection (e.g., timing detection). For each group α, β, γ of the respective CPs, the respective PSCs can have a location in the symbol sequence that can be unique to the group in which a respective PSC belongs to facilitate differentiating between PSCs, similar to that of the radio frames 200, 202, 204 of the short CP, and radio frames 206, 208, and 210 of the long CP of FIGS. 2A-2F, as described herein. Also, unique phase shifting of the respective SSCs for each group α, β, γ associated with a respective CP can be employed to facilitate providing information regarding respectively associated PSCs to facilitate identifying a base station 102 that has the PSC with the strongest correlation.

The CP length can be determined by comparing the correlation results associated with the timing detection, where, for instance, the PSC timing detection yielding the highest result can be associated with the desired CP and the CP length can be determined by the relative distance associated with the desired CP. For instance, with regard to FIGS. 3A-3F, if a mobile device 116 performs a first timing detection with a relative distance of 5 ms and that yields a first result (e.g., correlation value), and a second timing detection is performed with a relative distance of 5 ms+83 µs which yields a second result that is higher than the first result, the mobile device 116 can determine that the CP associated with the second result is the desired CP (e.g., associated with the desired base station 102), and based in part on the relative distance, the mobile device 116 can determine that it is a long CP, as the long CP has the longer relative distance, as illustrated in FIGS. 3A-3F, for example.

Referring once again to FIG. 1, in accordance with yet another aspect of the disclosed subject matter, the mobile device 116 can employ another technique to facilitate searching for and identifying the desired base station 102 in the network. Such technique can be utilized by the mobile station 116, for instance, when the SSC is placed in different directions for different groups such that the reference symbol position can be flexible. In such instances, there potentially can be an increase in the hypotheses that the mobile device 116 tests in order to identify the desired base station 102.

Referring briefly to FIGS. 4A-4F, depicted is an example of radio frames 400, 402, 404, 406, 408, 410, respectively, that can be representative of radio frames respectively associated with different base stations 102 in a network. With regard to FIGS. 4A-4C and corresponding radio frames 400, 402, and 404, such radio frames have a short CP. With regard to FIGS. 4D-4F and corresponding radio frames, 406, 408, and 410, such radio frames have a long CP. As an example, for the short CP (e.g., radio frames 400, 402, 404), the $0^{th}$ and the $4^{th}$ symbols can contain a reference signal, and for the long CP (e.g., radio frames 406, 408, 410), the $0^{th}$ and the $3^{rd}$ symbols can contain a reference signal.

As depicted in FIGS. 4A-4F, the SSCs can be positioned to the left or the right of the associated PSC in the symbol sequence, which can facilitate allowing flexibility with regard to the positioning of a reference signal. The mobile device 116 can detect the respective timing (e.g., determine symbol timing) associated with PSCs respectively associated with base stations 102 to detect the highest correlation value. To facilitate detecting the position of the SSC, once the timing associated with a particular PSC is detected, the mobile device 116 can test the hypotheses on the symbol positions on both the left and the right of the particular PSC, and can compare the results of the two hypotheses, where the hypotheses having the highest correlation result can be the position of the SSC associated with the particular PSC. The mobile device 116 can utilize the timing information and the information associated with the detected SSC (e.g., phase information) to facilitate identifying the desired base station 102 in the network.

Figure 5:
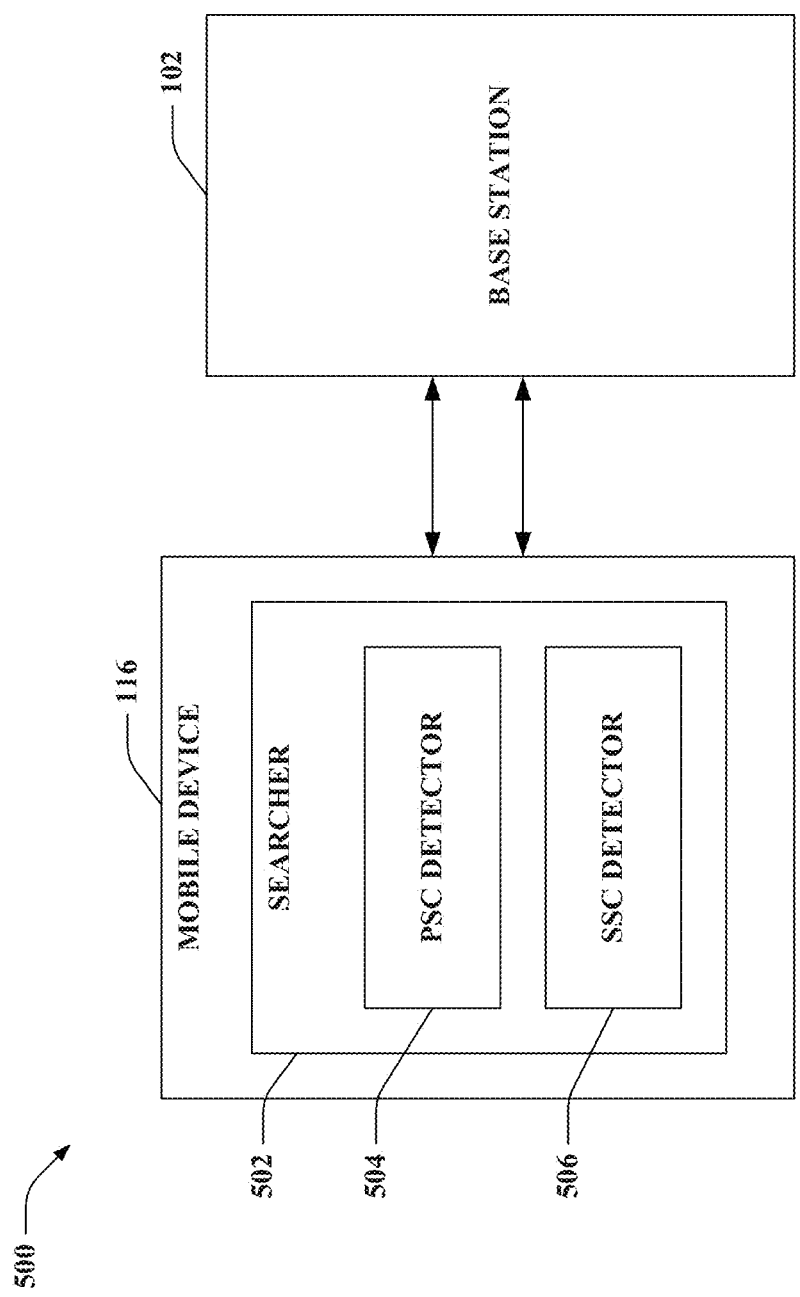
FIG. 5 is a depiction of an example system that can facilitate cell searches within a wireless communication environment.

With reference to FIG. 5, illustrated is a system 500 that can facilitate searches for a cell (e.g., base station) within a wireless communication environment. System 500 can include a base station 102 that can communicate with one or more mobile devices, such as mobile device 116. It is to be appreciated and understood that only one mobile device is depicted in FIG. 5 for clarity and brevity. Moreover, base station 102 can communicate with other base station(s) and/or any disparate devices (e.g., servers) (not shown) that can perform various functions. The base station 102 (e.g., cell) and mobile device 116 each can be respectively the same or similar as, and/or can comprise respectively the same or similar functionality as, respective components as more fully described herein, such as, for example, with regard to system 100.

Mobile device 116 can search for a base station 102 (e.g., cell) among a plurality of base stations in a wireless communication environment in order to establish communication with the base station 102 and other mobile devices (e.g., 122) in the wireless communication environment. In one aspect, to facilitate searching for a base station 102, the mobile device 116 can comprise a searcher 502 that can search for and detect signals provided by respective base stations (e.g., 102) to identify and/or locate a desired base station 102 with which to establish communication.

The searcher 502 can include a PSC detector 504 that can detect timing information (e.g., symbol timing) associated with respective PSCs transmitted by respective base stations (e.g., 102), where the timing information of respective PSCs can be analyzed and evaluated to facilitate determining the respective strengths of such PSCs, for instance. The PSC detector 504 can evaluate respective signal strengths and can perform calculations to determine respective correlation values associated with respective PSCs in order to identify the PSC having the highest correlation value, where such PSC can be associated with the desired base station 102 for which the searcher 502 is searching. The PSC detector 504 can also measure and/or evaluate relative distances respectively associated with PSCs, where such distance information can be utilized to facilitate determining CP lengths and/or identifying a base station 102.

The searcher 502 can further include a SSC detector 506 that can detect information associated with SSCs transmitted by respective base stations (e.g., 102), where the SSCs can be analyzed and evaluated to facilitate determining the respective phase angles between PSCs and respectively associated SSCs, identifying a particular base station 102, and/or facilitating establishing a connection between the mobile device 116 and a base station (e.g., 102), for example. The SSC detector 506 can detect phase shift information and/or other information to facilitate determining the base station 102 that is transmitting the PSC detected by the PSC detector 504. The SSC detector 506 can also evaluate the detected information to facilitate determining the number of antennas associated with a particular base station 102. The SSC detector 506 can evaluate and/or perform calculations with regard to the detected information associated with respective SSCs to determine the particular SSC that has the highest correlation value, where such SSC can be associated with the base station 102 for which the searcher 502 is searching.

In one aspect, the SSC detector 506 can be utilized to test hypotheses to facilitate detecting (e.g., blind detection) of a CP length, when SSC(s) associated with the short CP has the same phase shift as the SSC(s) associated with the long CP. The SSC detector 506 can evaluate and perform calculations to determine which SSC has the highest correlation value and can determine the CP length associated with the desired base station 102 based in part the on the SSC having the highest correlation value. The SSC detector 506 also can be utilized to test hypotheses to facilitate detecting the desired SSC when the SSC can be located on either side of an associated PSC in the symbol sequence. The SSC detector 506 can evaluate and perform calculations to determine which SSC has the highest correlation value and can determine the position of the SSC with respect to the associated PSC in the symbol sequence based in part the on the SSC having the highest correlation value. The SSC having the highest value can be the desired SSC and can be associated with the desired base station 102. Information, such as phase information, associated with the desired SSC can be evaluated to facilitate identifying the desired base station 102.

Figure 6:
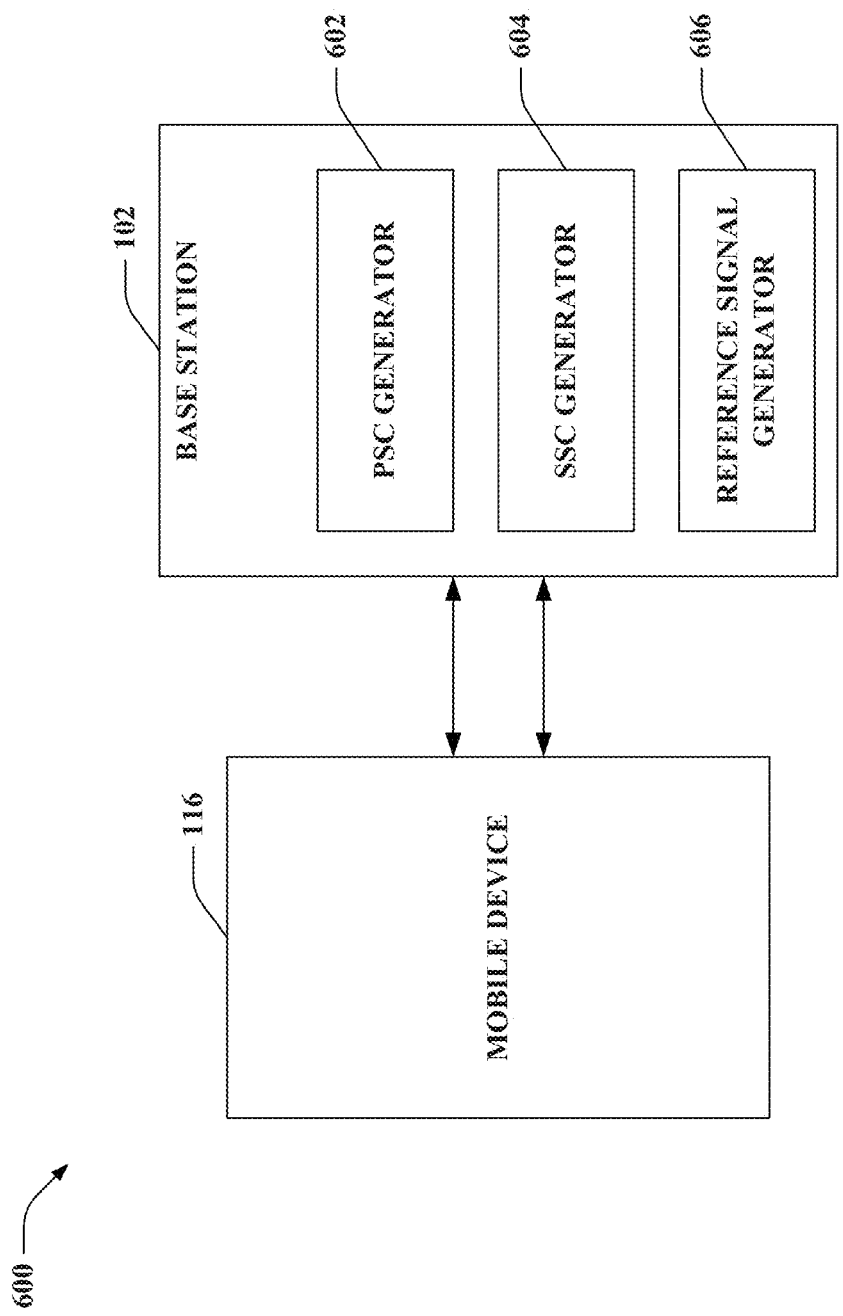
FIG. 6 is an illustration of an example system that can generate information to facilitate cell searches within a wireless communication environment.

Now referring to FIG. 6, illustrated is a system 600 that facilitate searches for a cell within a wireless communication environment. System 600 can include a plurality of base stations 102 (only one base station 102 is depicted in FIG. 6 for clarity and brevity) that can communicate with one or more mobile devices, such as mobile device 116, in a wireless communication environment. It is to be appreciated and understood that only one mobile device 116 is depicted in FIG. 6 for clarity and brevity. Moreover, base station 102 can communicate with other base station(s) and/or any disparate devices (e.g., servers) (not shown) that can perform various functions, as desired. The base station 102 and mobile device 116 each can be respectively the same or similar as, and/or can comprise respectively the same or similar functionality as, respective components as more fully described herein, such as, for example, with regard to system 100 and/or system 500.

Each base station 102 can include a PSC generator 602 that can facilitate generating and providing a PSC that can be transmitted in the wireless communication environment. The PSC can be utilized to facilitate searches by a mobile device 116 to locate, identify, and/or establish communication with a base station (e.g., 102) in the wireless communication environment (e.g., network). The PSC that is generated can be common to base stations 102 in the network or there can be more than one PSC with respective values that can be respectively employed by the base stations 102.

Each base station 102 can also include a SSC generator 604 that can generate and provide a SSC (e.g., each base station can generate a unique SSC) that can be transmitted (e.g., broadcast) in a wireless communication environment. A SSC can facilitate cell searches, as the mobile device 116 can detect information associated with a SSC, and the SSC along with the PSC can be utilized to facilitate searches for a desired base station 102 in the wireless communication environment and establishing communication with such base station 102.

Further, each base station 102 can also include a reference signal generator 606 that can generate and provide reference signals. The reference signals can be detected utilized, as desired, by the mobile device 116 to facilitate detecting the timing related to PSCs and/or facilitate identifying a desired base station 102.

Figure 7:
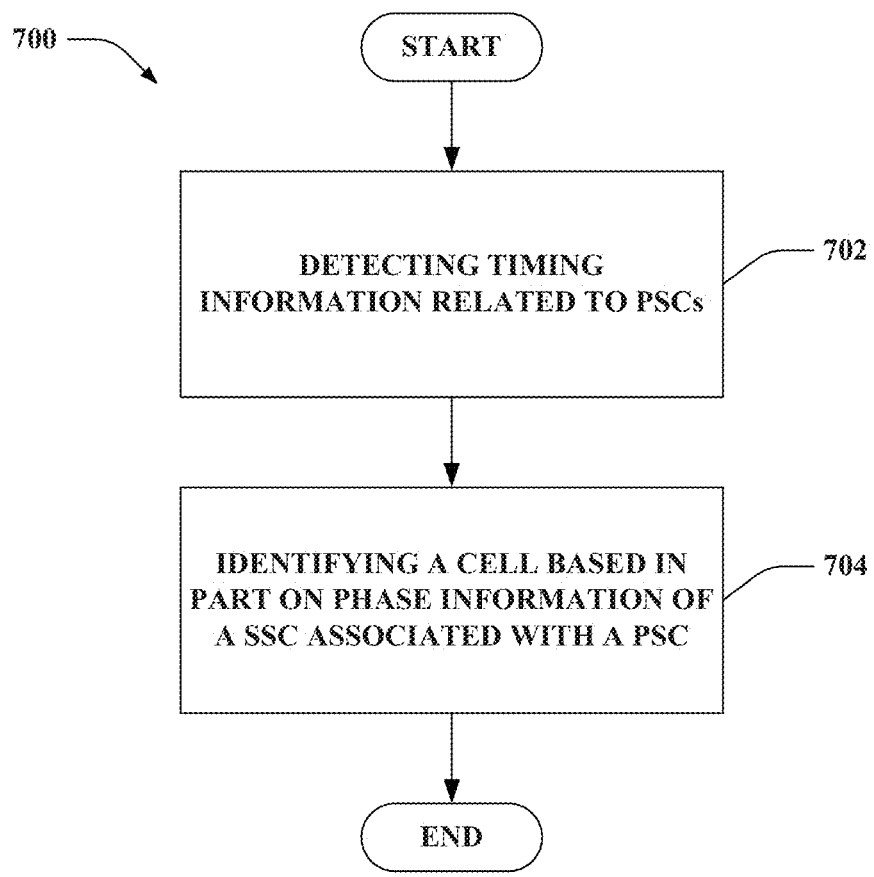
FIG. 7 is an illustration of an example methodology that can facilitate searching for cells within a wireless communication environment.
Figure 8:
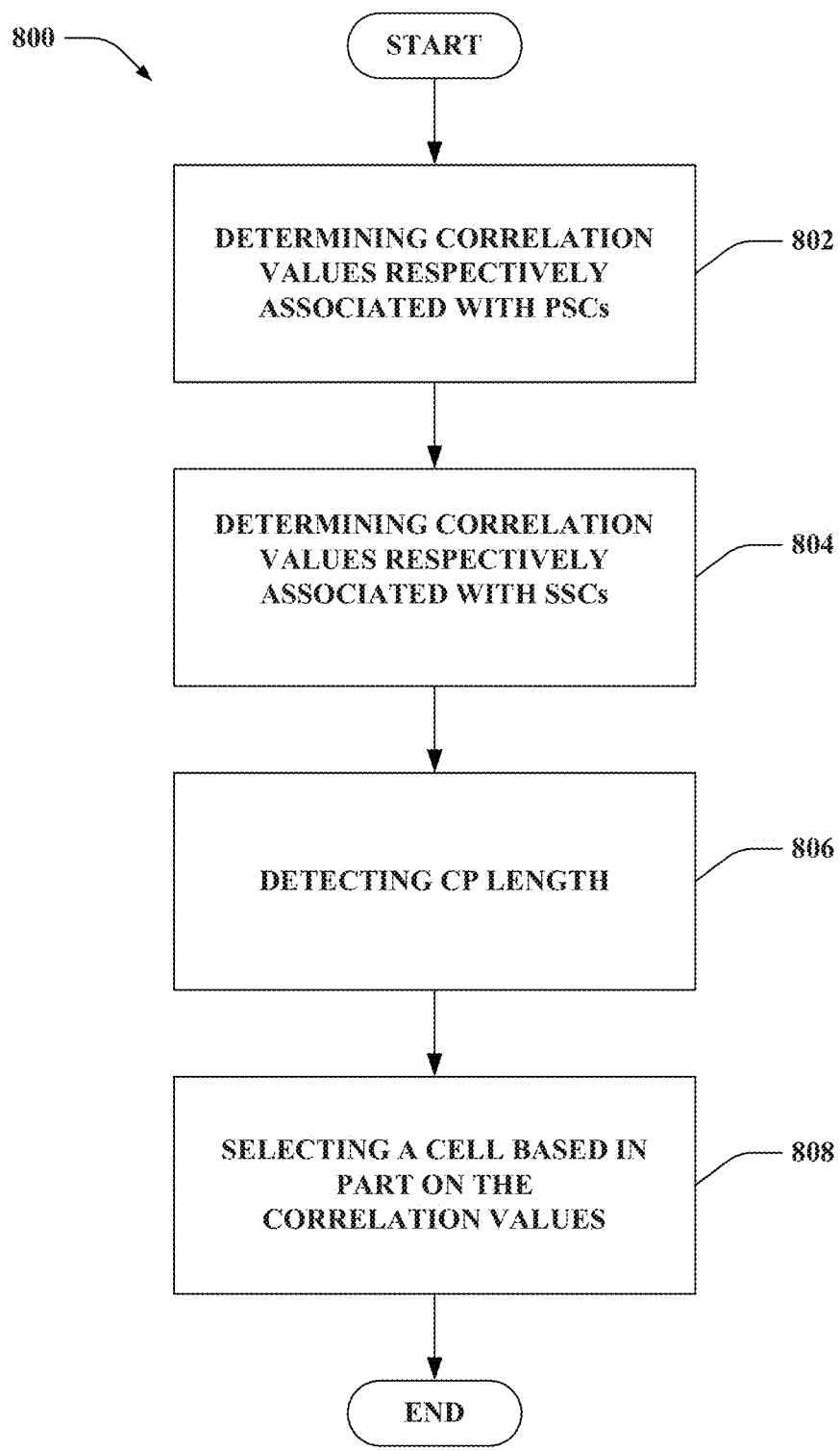
FIG. 8 is an illustration of another example methodology that can facilitate searching for cells within a wireless communication environment.

Referring to FIGS. 7-8, methodologies relating to utilizing pilot(s) to enable inter-technology handoffs in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that can facilitate searching for a cell (e.g., base station 102) in a wireless communication environment. At 702, timing information can be detected. In one aspect, timing information can be respectively associated with PSCs, which can respectively be associated with cells in a network. A mobile device 116 can utilize a searcher (e.g., 502) that can detect timing information respectively associated with PSCs and associated cells. The searcher can evaluate received information and can perform calculations to facilitate detecting and/or determining timing information, which can be utilized to facilitate locating a desired cell.

At 704, a cell can be identified based in part on phase information of a SSC associated with the PSC. In one aspect, the searcher can detect SSCs, and information associated therewith, such as phase information, which can be utilized to determine which SSC has the highest correlation, identifying a desired cell, and/or detecting a CP, for instance. The searcher can evaluate received information, such as information associated with SSCs and/or PSCs, to facilitate detecting SSCs, identifying cells, and/or detecting CPs. Information regarding the location of a PSC in a symbol sequence and/or phase information of a SSC, where the PSC can be utilized as a phase reference with respect to the associated SSC, can be utilized by the searcher in making determinations and/or identifications with respect to a desired cell.

Turning to FIG. 8, illustrated is a methodology 800 that can facilitate searching for cells in a wireless communication environment. At 802, correlation values respectively associated with PSCs can be determined. In one aspect, a mobile device (e.g., 116) can employ a searcher (e.g., 502) that can determine and/or calculate correlation values associated with respective PSCs to determine the PSC with the highest correlation value. The PSC with the highest correlation value can be associated with a desired cell (e.g., a desired base station 102) with which the mobile device desires to identify and establish communication. The correlation values can correspond to the timing information respectively associated with PSCs.

At 804, correlation values respectively associated with SSCs can be determined. In one aspect, the searcher can determine and/or calculate correlation values associated with respective SSCs, where the searcher can determine which SSC has the highest correlation value. The SSC with the highest correlation value can be associated with the desired cell. Phase information associated with the SSCs can be utilized to facilitate detecting the desired SSC. At 806, a CP length can be detected. In one aspect, where the CP length is unknown but the relative timing distance between two PSCs in a radio frame is fixed, the searcher can employ blind CP detection to facilitate detecting the CP length. In another aspect, when the relative distance between two consecutive PSCs related to a short CP is different from the relative distance between two consecutive PSCs related to a long CP, the searcher can detect and/or determine the CP length by calculating correlation values at different relative distances, where the relative distance associated with the highest correlation value can be associated with the CP length that is desired to be detected.

At 808, a cell can be selected based in part on the correlation values. In one aspect, the searcher can determine the PSC that is associated with the highest correlation value as compared to other PSCs, the SSC the is associated with a highest correlation value as compared to other SSCs, and/or the CP length that is associated with a highest correlation value as compared to other CP lengths, to facilitate selecting a cell, which can be the desired base station (e.g., base station having the strongest signal) with which the mobile device can desire to establish communication.

It will be appreciated that, in accordance with one or more aspects described herein, inferences can be made regarding searching for base stations (e.g., cells) by a mobile device in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to detecting a PSC, detecting a SSC, determining a relative strength of a PSC or other signal, etc. It will be appreciated that the foregoing examples are illustrative in nature and are not intended to limit the number of inferences that can be made or the manner in which such inferences are made in conjunction with the various embodiments and/or methods described herein.

Figure 9:
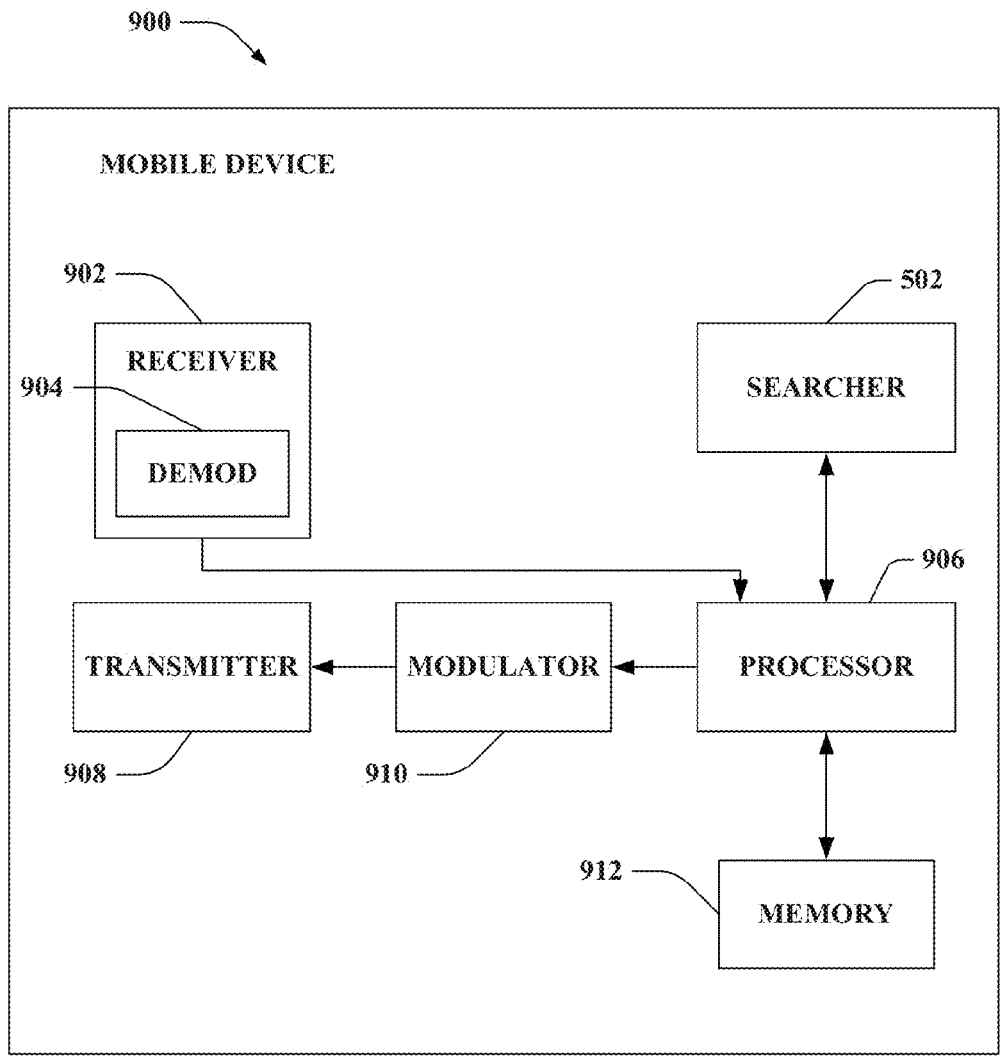
FIG. 9 is a depiction of an example mobile device that can facilitate performance of searches for base stations in a wireless communication system.

FIG. 9 is an illustration of a mobile device 900 that can facilitate performing searches for base stations in a wireless communication system. Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900.

Mobile device 900 can also comprise a modulator 910 that can work in conjunction with the transmitter 908 to facilitate transmitting signals (e.g., data) to, for instance, a base station 102, another mobile device, etc.

Mobile device 900 can additionally comprise memory 912 that can be operatively coupled to processor 906 and that can store data to be transmitted, received data, information related to PSCs associated with base stations, information related to SSCs associated with respective base stations, information associated with correlation determinations related to cell searches, information related to CP lengths, and/or other information that can facilitate performing searches for a desired base station 102 (e.g., cell) in a wireless communication environment. Memory 912 can additionally store protocols and/or algorithms associated with searching for base stations in a wireless communication environment.

It will be appreciated that the memory 912 (e.g., data store) described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 912 of the subject systems and methods is intended to comprise, without being limited to, these and any other suitable types of memory.

The processor 906 can also comprise a searcher 502 that can facilitate searches by the mobile device 900 to locate, identify, and/or establish communication with a desired base station (e.g., 102) amongst a plurality of base stations in a wireless communication environment. It is to be appreciated and understood that the searcher 502 can be the same or similar as, or can comprise the same or similar functionality as, respective components such as more fully described herein, for example, with regard to system 100 and/or system 500. It is to be further appreciated and understood that the searcher 502 can be a stand-alone unit (as depicted), can be contained within the processor 906, can be incorporated within another component, and/or virtually any suitable combination thereof, as desired.

Figure 10:
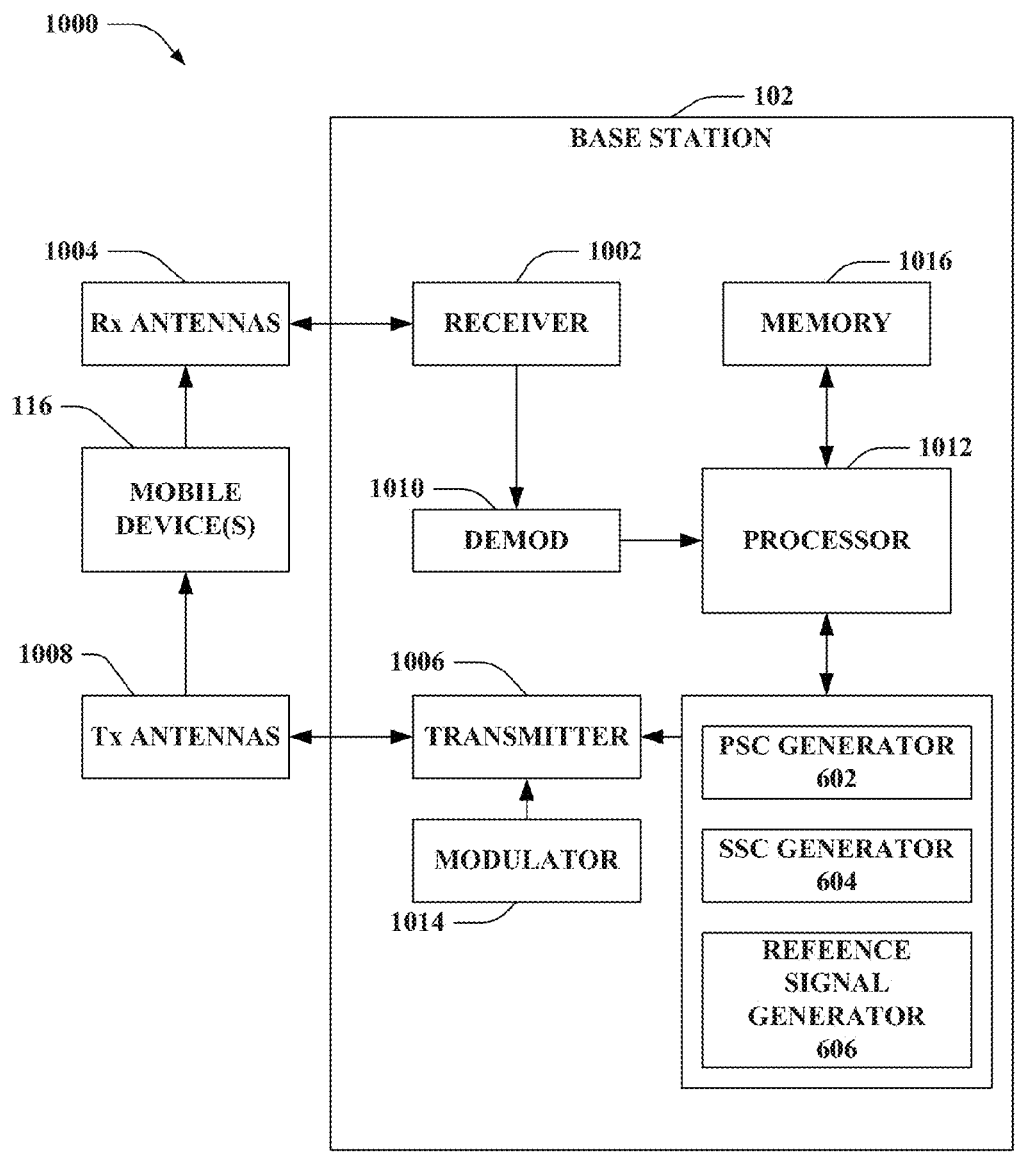
FIG. 10 is an illustration of an example system that can generate information to facilitate searches for base stations associated with a wireless communication environment.

FIG. 10 is an illustration of a system 1000 that can facilitate searches for a base station associated with a wireless communication system. System 1000 can comprise a plurality of base stations 102 (e.g., access point, . . . ) (only one base station is depicted in FIG. 10 for brevity and clarity), where each base station 102 can include a receiver 1002 that can receive signal(s) from one or more mobile devices 116 through a plurality of receive antennas 1004, and a transmitter 1006 that can transmit signals (e.g., data) to the one or more mobile devices 116 through a transmit antenna 1008. Receiver 1002 can receive information from receive antennas 1004 and can be operatively associated with a demodulator 1010 that can demodulate received information. Demodulated symbols can be analyzed by a processor 1012 that can be a processor dedicated to analyzing information received by receiver 1002 and/or generating information for transmission by a transmitter 1006, a processor that controls one or more components of base station 102, and/or a processor that both analyzes information received by receiver 1002, generates information for transmission by transmitter 1006, and controls one or more components of base station 102. The base station 102 can also comprise a modulator 1014 that can work in conjunction with the transmitter 1006 to facilitate transmitting signals (e.g., data) to, for instance, a mobile device 116, another device, etc.

Processor 1012 can be coupled to a memory 1016 that can store information related to data to be transmitted, received data, information related to a PSC, information related to a SSC, and/or other information relevant to searches by a mobile device 116 for a base station (e.g., 102) in a wireless communication environment. Memory 1016 can additionally store protocols and/or algorithms associated with and facilitating providing PSCs and/or SSCs in order to facilitate searches by a mobile device 116 for a base station 102 in the wireless communication environment.

Processor 1012 can be coupled to a PSC generator 602 that can facilitate generating and providing a PSC that can be transmitted in the wireless communication environment. The PSC can be utilized to facilitate searches by a mobile device 116 to locate, identify, and/or establish communication with the base station 102 in the wireless communication environment. It is to be appreciated and understood that the PSC generator 602 can be the same or similar as, or can comprise the same or similar functionality as, respective components such as more fully described herein, for example, with regard to system 100 and/or system 600. It is to be further appreciated and understood that the PSC generator 602 can be a stand-alone unit (as depicted), can be included within the processor 1012, can be incorporated within another component, and/or virtually any suitable combination thereof, as desired.

Processor 1012 can be coupled to a SSC generator 604 that can generate and provide a SSC (e.g., each base station can generate a unique SSC) that can be transmitted (e.g., broadcast) in a wireless communication environment. A SSC can be detected by a mobile device 116, and the SSC along with the PSC can be utilized to facilitate searches for a desired base station 102 in the wireless communication environment and establishing communication with such base station 102. It is to be appreciated and understood that the SSC generator 604 can be the same or similar as, or can comprise the same or similar functionality as, respective components such as more fully described herein, for example, with regard to system 100 and/or system 600. It is to be further appreciated and understood that the SSC generator 604 can be can be a stand-alone unit (as depicted), included within the processor 1012, can be incorporated within another component, and/or virtually any suitable combination thereof, as desired.

Figure 11:
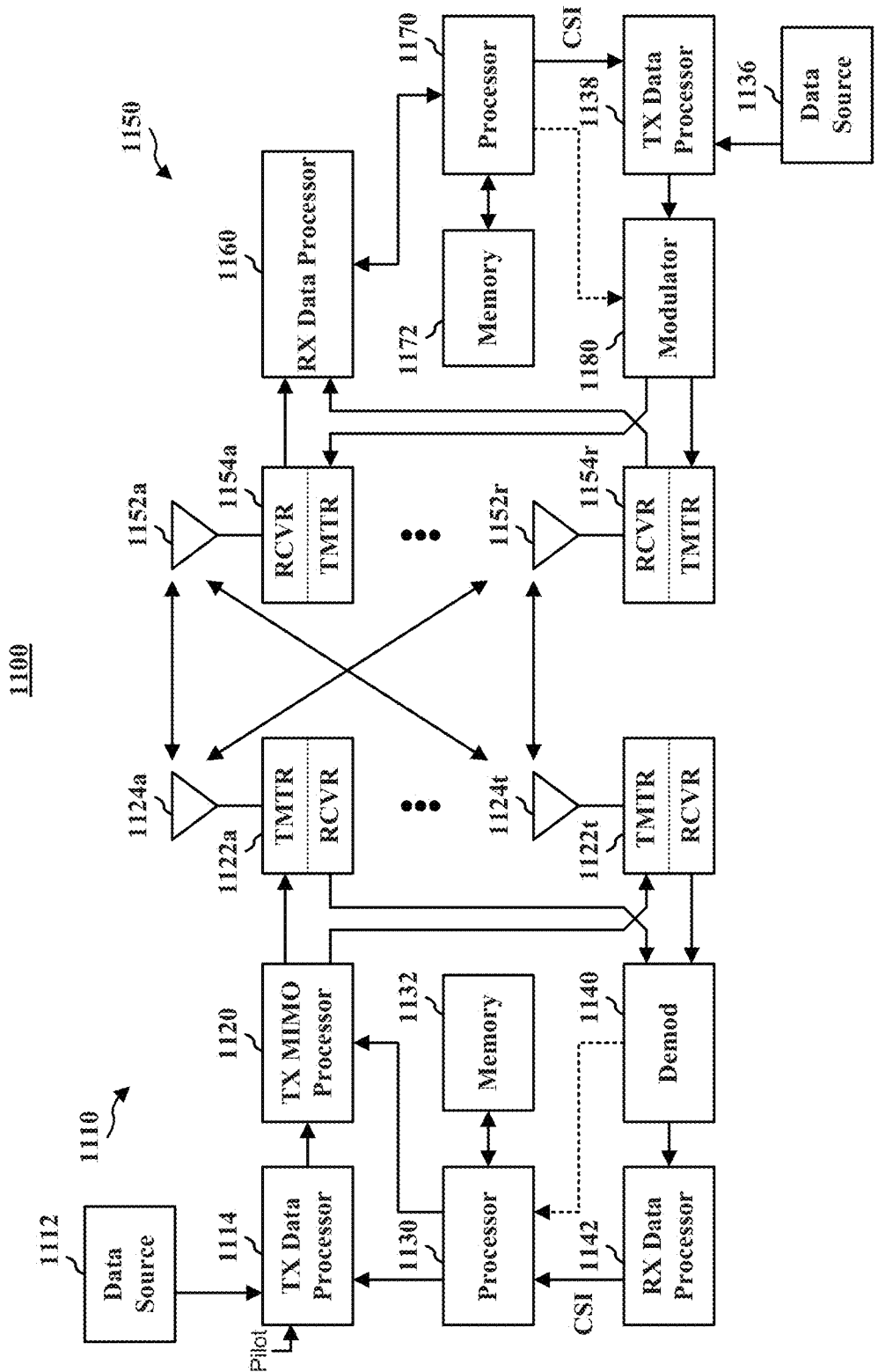
FIG. 11 is an illustration of an example wireless network environment that can be employed in conjunction with the various systems and methods described herein.

Processor 1012 can be and/or can be coupled to a reference signal generator 606 that can generate and provide reference signals, for example, to mobile devices (e.g., 116) to facilitate timing detection and/or facilitate identifying a desired base station 102 during searches for a desired base station 102 by a mobile device (e.g., 116). It is to be appreciated and understood that the reference signal generator 606 can be the same or similar as, or can comprise the same or similar functionality as, respective components such as more fully described herein, for example, with regard to system 100 and/or system 600. It is to be further appreciated and understood that the reference signal generator 606 can be can be a stand-alone unit (as depicted), included within the processor 1012, can be incorporated within another component, and/or virtually any suitable combination thereof, as desired FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1, 5-6, and 9-10) and/or methods (FIGS. 7-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
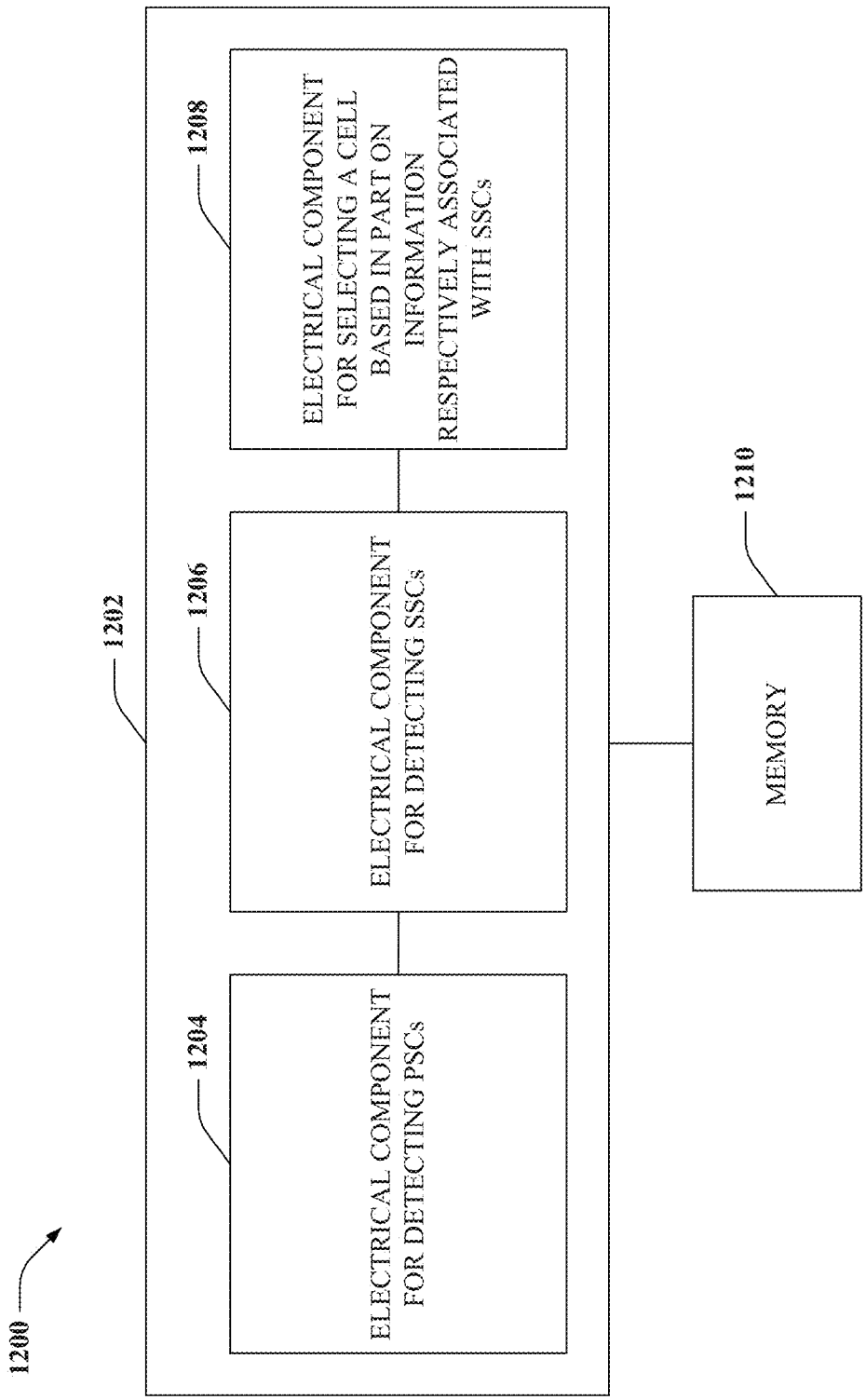
FIG. 12 is an illustration of an example system that can facilitate searching for base stations in a wireless communication environment.

With reference to FIG. 12, illustrated is a system 1200 that can facilitate searches for a cell in a wireless communication environment. For example, system 1200 can reside at least partially within a mobile device (e.g., 116). It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for detecting PSCs 1204. In one aspect, the timing information associated with respective PSCs and/or other information respectively associated with PSCs can be detected by the electrical component for detecting PSCs 1204. Further, logical grouping 1202 can comprise an electrical component for detecting SSCs 1206. In accordance with one aspect, information associated with SSCs (e.g., phase information, correlation information, etc.) and/or information associated with CP length can be detected by the electrical component for detecting SSCs 1206. Moreover, logical grouping 1202 can include an electrical component for selecting a cell based in part on the information respectively associated with the SSCs 1208. In one aspect, a cell (e.g., base station 102) can be selected based in part on the SSC information and/or other information, such as timing information respectively associated with PSCs, by the electrical component 1208. Additionally, system 1200 can include a memory 1210 that retains instructions for executing functions associated with electrical components 1204, 1206, and 1208. While shown as being external to memory 1210, it is to be understood that one or more of electrical components 1204, 1206, and 1208 can exist within memory 1210.

Figure 13:
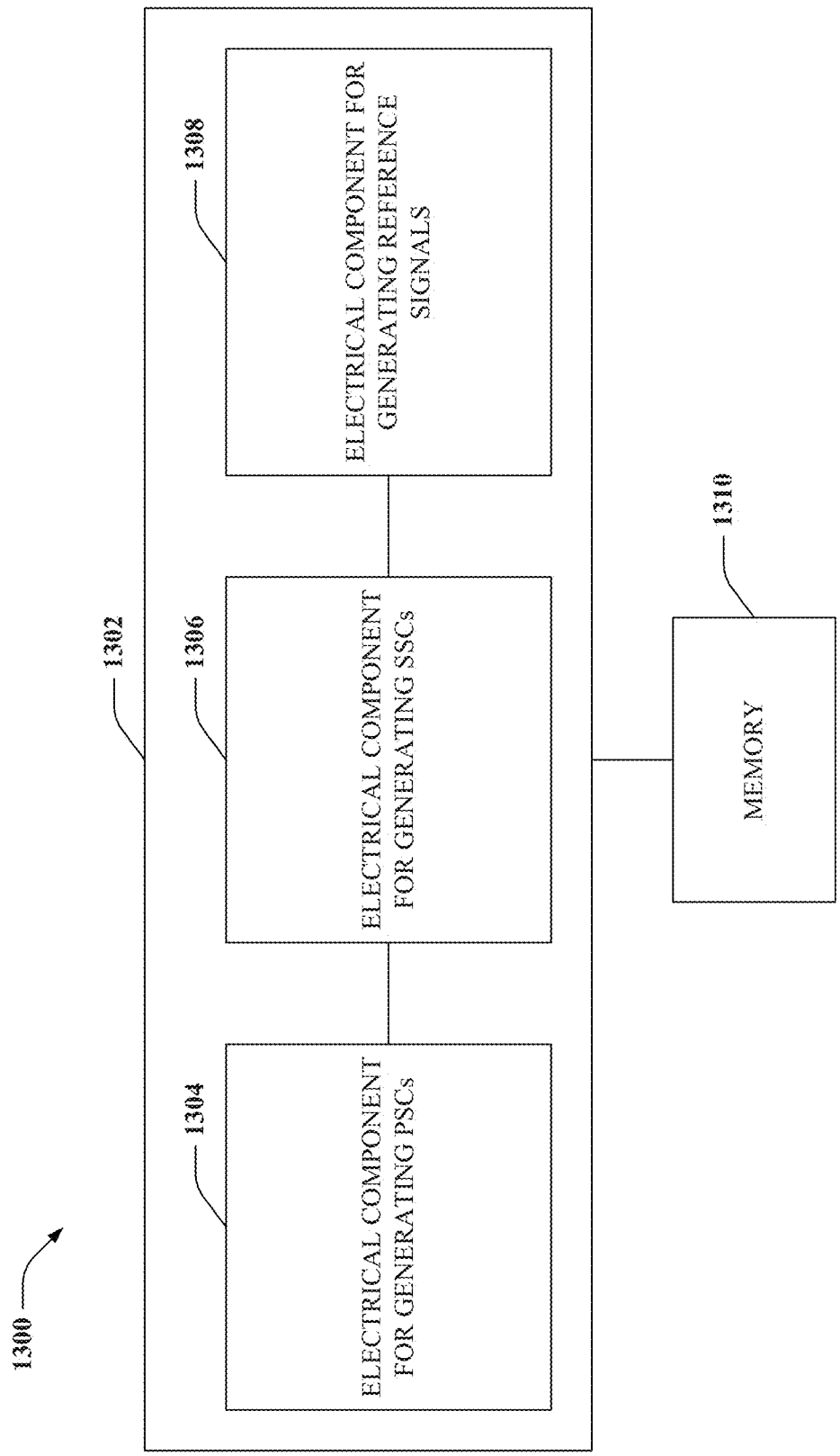
FIG. 13 is a depiction of another example system that can facilitate searching for base stations in a wireless communication environment.

Turning to FIG. 13, illustrated is a system 1300 that can facilitate searches for a cell in a wireless communication environment. System 1300 can reside within a base station (e.g., 102), for instance. As depicted, system 1300 includes functional blocks that can represent functions implemented by a processor, software, or combination thereof (e.g., firmware). System 1300 includes a logical grouping 1302 of electrical components that can act in conjunction. Logical grouping 1302 can include an electrical component for generating PSCs 1304. Moreover, logical grouping 1302 can include an electrical component for generating SSCs 1306. In one aspect, the generated SSCs can be unique to facilitate cell searches (e.g., a base station can be associated with one or more SSCs that can be different from one or more SSCs associated with a disparate base station). Further, logical grouping 1302 can include an electrical component for generating reference signals 1308. In one aspect, the reference signals can be employed to facilitate detecting timing information associated with PSCs and/or can facilitate cell searches. Additionally, system 1300 can include a memory 1310 that retains instructions for executing functions associated with electrical components 1304, 1306, and 1308. While shown as being external to memory 1310, it is to be understood that electrical components 1304, 1306, and 1308 can exist within memory 1310.

Figure 14:
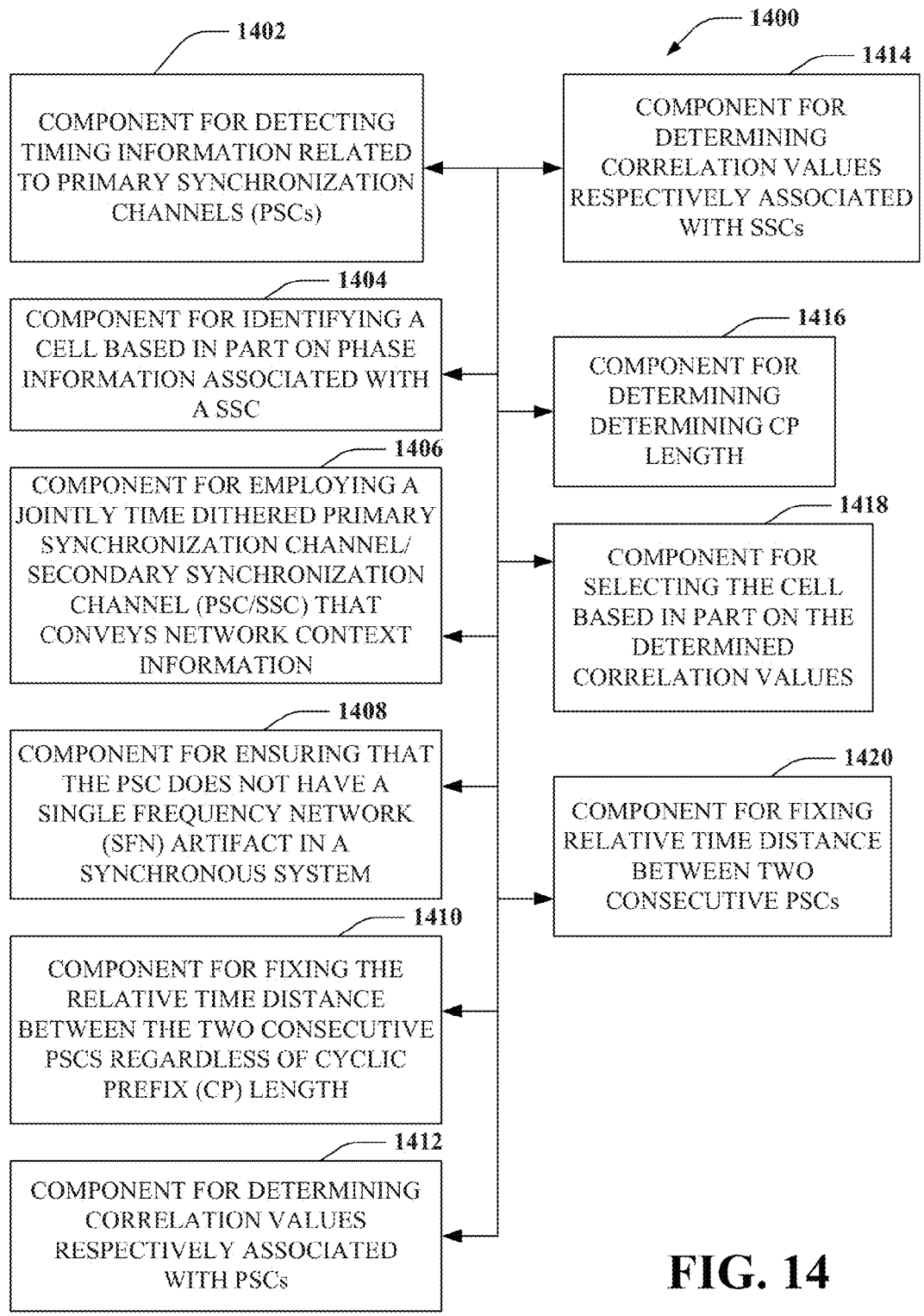
FIG. 14 is a depiction of another example system that can facilitate searching for base stations in a wireless communication environment.

FIG. 14 illustrates another example system that can facilitate searching for base stations in a wireless communication environment. The system 1402 includes a component 1402 for detecting timing information related to primary synchronization channels (PSCs); a component 1404 for identifying a cell based in part on phase information associated with a PSC; a component 1406 for employing a jointly time dithered primary synchronization channel/secondary synchronization channel (PSC/SSC) that conveys network context information; a component 1408 for ensuring that the PSC does not have a single frequency network (SFN) artifact in a synchronous system; a component 1410 for fixing the relative time distance between the two consecutive PSCs regardless of cyclic prefix (CP) length; a component 1412 for determining correlation values respectively associated with PSCs; a component 1414 for determining correlation values respectively associated with SSCs; a component 1416 for determining CP length a component 1418 for selecting the cell based in part on the determined correlation values; and/or a component 1420 for fixing relative time distance between two consecutive PSCs.

It is to be appreciated that the aforementioned components of system 1400 can be hardware, software, or a combination thereof. It is further to be appreciated that the system 1400 does not require all respective components, and that many suitable combinations of subsets of these components can be employed in connection with carrying out functionalities described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates a multi-stage cell search, comprising:
   detecting primary synchronization channels (PSCs), wherein a relative time distance between two consecutive PSCs is fixed regardless of a cyclic prefix (CP) length;
   using the PSCs as a phase reference for detecting secondary synchronization channels (SSCs); and
   determining a phase shift of one of the SSCs based at least in part on the phase reference.

2. The method of claim 1, further comprising identifying a cell based in part on phase information associated with the SSCs.

3. The method of claim 2, further comprising:
   evaluating the phase information associated with the SSCs to identify a first cell that transmitted a strongest signal; and
   establishing communication with the first cell.

4. The method of claim 1, further comprising:
   determining correlation values respectively associated with the PSCs;
   determining correlation values respectively associated with the SSCs; and
   selecting a cell based at least in part on the correlation values.

5. The method of claim 1, further comprising:
   detecting which secondary synchronization channel (SSC) sequence has been transmitted from a particular cell; and
   determining a hypothesis associated with an identified cell, different from the particular cell, based at least in part on detecting the SSC from the particular cell.

6. The method of claim 1, further comprising:
   utilizing phase information associated with a secondary synchronization channel (SSC) sequence to facilitate determining a location of an associated PSC in a symbol sequence.

7. The method of claim 1, further comprising:
   detecting the relative time distance between two PSCs based at least in part on timing information related to the detected PSCs.

8. The method of claim 1, wherein one or more of the SSCs comprise Chu sequences with at least one of different bases or different cyclic shifts.

9. The method of claim 1, further comprising:
   applying a different phase shift to SSCs in each different cell in a network.

10. The method of claim 9, wherein a first SSC and a second SSC have different combinations of phase shift.

11. The method of claim 1, wherein a first SSC and a second SSC have a same phase shift.

12. The method of claim 1, wherein an additional phase shift of $e^{jk\theta}$ is applied to SSCs, where k=0, 1, 2, ..., M−1, and $\theta=2\pi/M$, wherein M relates to a number of different phases that can be employed.

13. The method of claim 1, further comprising:
   determining a number of antennas associated with a particular cell based at least in part on phase information associated with an SSC.

14. A non-transitory computer readable medium storing code for wireless communication, the code comprising instructions for:
   detecting primary synchronization channels (PSCs), wherein a relative time distance between two consecutive PSCs is fixed regardless of cyclic prefix (CP) length;
   using the PSCs as a phase reference for detecting secondary synchronization channels (SSCs); and
   determining a phase shift of one of the SSCs based at least in part on the phase reference.

15. An apparatus operable in a wireless communication system, the apparatus comprising:
   means for detecting primary synchronization channels (PSCs), wherein a relative time distance between two consecutive PSCs is fixed regardless of cyclic prefix (CP) length;
   means for using the PSCs as a phase reference for detecting secondary synchronization channels (SSCs); and
   means for determining a phase shift of one of the SSCs based at least in part on the phase reference.

16. An apparatus operable in a wireless communication system, the apparatus comprising:
   a processor, configured to:
      detect primary synchronization channels (PSCs), wherein a relative time distance between two consecutive PSCs is fixed regardless of cyclic prefix (CP) length;
      use the PSCs as a phase reference for detecting secondary synchronization channels (SSCs); and
      determine a phase shift of one of the SSCs based at least in part on the phase reference.

17. The apparatus of claim 16, wherein the processor is further configured to identify a cell based in part on phase information associated with the SSCs.

18. The apparatus of claim 17, wherein the processor is further configured to:

evaluate the phase information associated with the SSCs to identify a first cell that transmitted a strongest signal; and establish communication with the first cell.

19. The apparatus of claim 16, wherein the processor is further configured to:

determine correlation values respectively associated with the PSCs;

determine correlation values respectively associated with the SSCs; and select a cell based at least in part on the correlation values.

20. The apparatus of claim 16, wherein the processor is further configured to:

detect which secondary synchronization channel (SSC) sequence has been transmitted from a particular cell; and determine a hypothesis associated with an identified cell, different from the particular cell, based at least in part on detecting the SSC from the particular cell.

21. The apparatus of claim 16, wherein the processor is further configured to:

utilize phase information associated with a secondary synchronization channel (SSC) sequence to facilitate determining a location of an associated PSC in a symbol sequence.

22. The apparatus of claim 16, wherein the processor is further configured to:

detect the relative time distance between two PSCs based at least in part on timing information related to the detected PSCs.

23. The apparatus of claim 16, wherein one or more of the SSCs comprise Chu sequences with at least one of different bases or different cyclic shifts.

24. The apparatus of claim 16, wherein the processor is further configured to:

apply a different phase shift to SSCs in each different cell in a network.

25. The apparatus of claim 24, wherein a first SSC and a second SSC have different combinations of phase shift.

26. The apparatus of claim 16, wherein a first SSC and a second SSC have a same phase shift.

27. The apparatus of claim 16, wherein an additional phase shift of $e^{jk\theta}$ is applied to SSCs, where k=0, 1, 2, . . . , M−1, and $\theta=2\pi/M$, wherein M relates to a number of different phases that can be employed.

28. The apparatus of claim 16, wherein the processor is further configured to:

determine a number of antennas associated with a particular cell based on phase information associated with an SSC.

* * * * *